US012262849B2

(12) United States Patent
Sergyeyenko et al.

(10) Patent No.: US 12,262,849 B2
(45) Date of Patent: Apr. 1, 2025

(54) MODULAR HAND-HELD KITCHEN APPLICANCE

(71) Applicant: Black & Decker, Inc., New Britain, CT (US)

(72) Inventors: Oleksiy Sergyeyenko, Baldwin, MD (US); Thomas Landis, Baltimore, MD (US); Michael C. Doyle, Baldwin, MD (US); Kendall Nohe, Baltimore, MD (US); Ashok Baskar, Glen Arm, MD (US); Andrew Cross, Bel Air, MD (US); Daniel Langford, Baltimore, MD (US)

(73) Assignee: Black & Decker, Inc., New Britain, CT (US)

( * ) Notice: Subject to any disclaimer, the term of this patent is extended or adjusted under 35 U.S.C. 154(b) by 963 days.

(21) Appl. No.: 17/167,150

(22) Filed: Feb. 4, 2021

(65) Prior Publication Data
US 2022/0240723 A1 Aug. 4, 2022

(51) Int. Cl.
A47J 43/044 (2006.01)
A47J 43/06 (2006.01)
A47J 43/07 (2006.01)
A47J 43/08 (2006.01)

(52) U.S. Cl.
CPC ......... A47J 43/0711 (2013.01); A47J 43/044 (2013.01); A47J 43/06 (2013.01); A47J 43/082 (2013.01); A47J 2043/04409 (2013.01); A47J 2201/00 (2013.01)

(58) Field of Classification Search
CPC ...... A47J 43/0711; A47J 43/044; A47J 43/06; A47J 43/082; A47J 2043/04409; A47J 2201/00
See application file for complete search history.

(56) References Cited

U.S. PATENT DOCUMENTS

| 3,827,641 A * | 8/1974 | Andersson | A47J 42/04 241/169.1 |
| 4,297,038 A | 10/1981 | Falkenbach | |
| 4,637,283 A | 1/1987 | Bertram et al. | |
| 4,709,865 A | 12/1987 | Bounds | |
| 4,844,352 A | 7/1989 | Griffin | |

(Continued)

FOREIGN PATENT DOCUMENTS

| CA | 931373 A | 8/1973 |
| CN | 202880808 U | 4/2013 |

(Continued)

OTHER PUBLICATIONS

Partial European Search Report, dated Jul. 18, 2022, for related EP Application No. 22153818.4-1016.

(Continued)

*Primary Examiner* — Faye Francis
(74) *Attorney, Agent, or Firm* — Caeden C. Drayton

(57) ABSTRACT

The present invention is directed to a hand-held modular kitchen multitool having a universal powerhead capable of being used with a variety of kitchen appliance attachments, such as a blender, a whisker, a wine opener, a can opener, and a spice grinder. A dual spice grinder attachment is also disclosed that can select one of two spices to grind. Also disclosed is a wine opener that automatically removes a cork from a bottle.

4 Claims, 28 Drawing Sheets

(56) References Cited

U.S. PATENT DOCUMENTS

Figure 1:
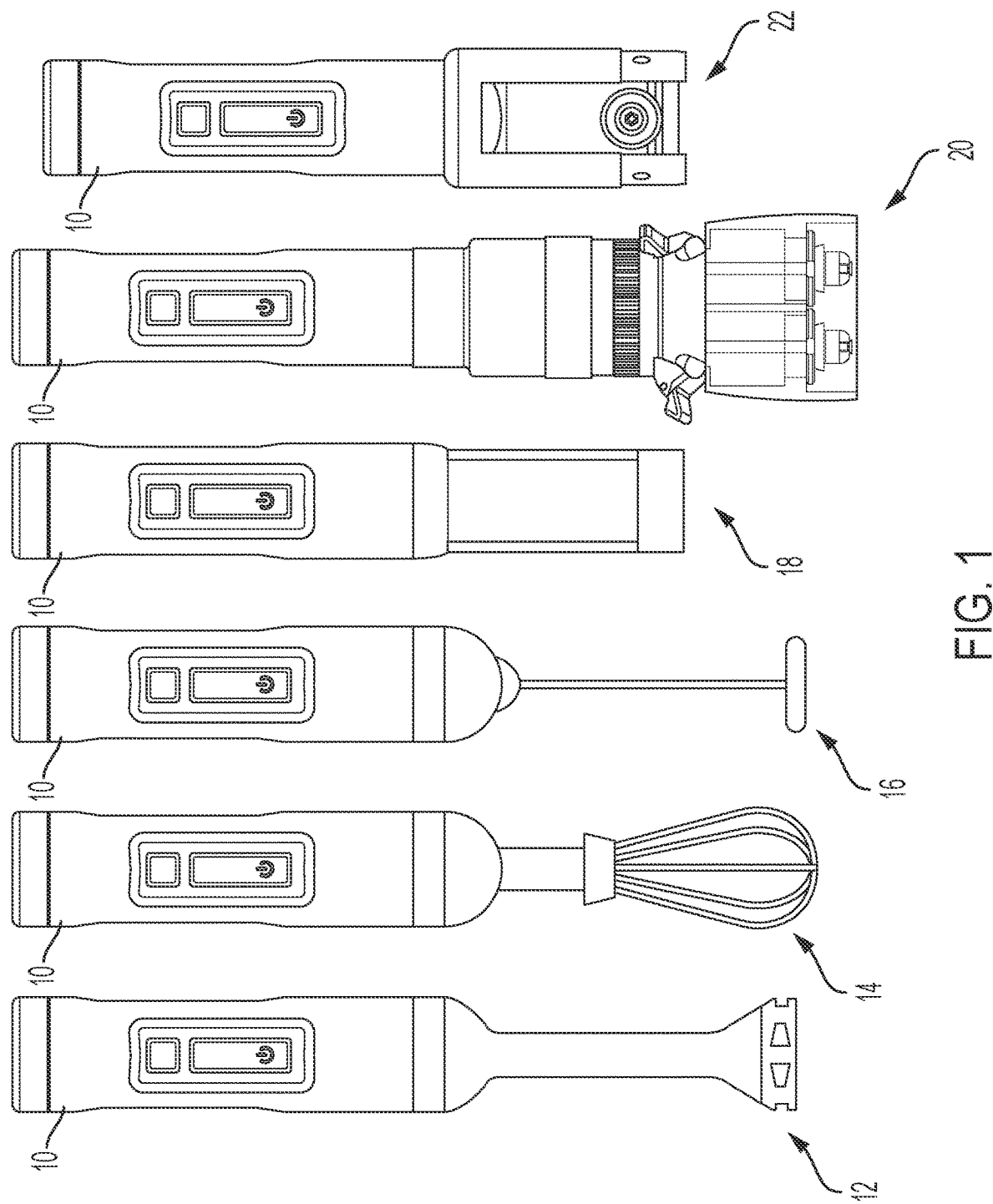

| | | | |
|---|---|---|---|
| 4,925,150 A * | 5/1990 | Tedioli | A47J 42/06 |
| | | | 241/169.1 |
| 5,079,975 A | 1/1992 | Spencer | |
| 5,088,652 A | 2/1992 | Chen | |
| 5,095,778 A | 3/1992 | Bocsi et al. | |
| 5,351,579 A | 10/1994 | Metz et al. | |
| 5,724,869 A | 3/1998 | May | |
| 6,196,086 B1 | 3/2001 | Gort-Barten | |
| 6,719,450 B2 | 4/2004 | Glucksman et al. | |
| 6,752,041 B2 | 6/2004 | Lee | |
| 6,789,933 B2 | 9/2004 | Gili et al. | |
| 6,811,298 B2 | 11/2004 | Peñaranda et al. | |
| 6,962,302 B2 | 11/2005 | Cheng | |
| 7,371,003 B2 | 5/2008 | Hamelin | |
| 7,380,737 B2 | 6/2008 | Wang | |
| 7,461,967 B2 | 12/2008 | Garcia et al. | |
| 7,533,838 B2 | 5/2009 | Kalogroulis et al. | |
| 7,637,447 B2 | 12/2009 | Tang | |
| 7,708,220 B1 | 5/2010 | Tang | |
| 7,975,946 B2 | 7/2011 | Bodum | |
| 7,993,054 B2 | 8/2011 | Wulf et al. | |
| 8,578,819 B2 | 11/2013 | Cheung | |
| 8,757,287 B2 | 6/2014 | Mak et al. | |
| 8,757,529 B2 | 6/2014 | Tang | |
| 9,138,102 B2 | 9/2015 | Rosenwirth et al. | |
| 9,149,065 B2 | 10/2015 | Hoare et al. | |
| 9,261,168 B2 | 2/2016 | Yang | |
| 9,272,890 B2 | 3/2016 | Lawlor et al. | |
| 9,516,975 B2 | 12/2016 | Wong | |
| 9,572,457 B2 | 2/2017 | Ryan | |
| 9,603,490 B2 | 3/2017 | Cheung et al. | |
| 9,637,367 B1 | 5/2017 | Arnold | |
| 9,688,522 B2 | 6/2017 | Song | |
| 9,693,657 B2 | 7/2017 | Naden et al. | |
| 10,173,188 B2 | 1/2019 | Cheung et al. | |
| 10,328,562 B2 | 6/2019 | Benson et al. | |
| 10,455,966 B2 | 10/2019 | Thomas et al. | |
| 2002/0178867 A1 | 12/2002 | Lun | |
| 2003/0217621 A1 | 11/2003 | Su | |
| 2004/0083783 A1 | 5/2004 | Brandalise | |
| 2009/0314867 A1 * | 12/2009 | Bodum | A47J 42/46 |
| | | | 241/169.1 |
| 2012/0241543 A1 * | 9/2012 | Tang | A47J 42/04 |
| | | | 241/168 |
| 2013/0202401 A1 | 8/2013 | Taitler | |
| 2014/0123813 A1 | 5/2014 | Leung | |
| 2015/0060519 A1 | 3/2015 | Shelton, IV et al. | |
| 2015/0146497 A1 | 5/2015 | Brenna | |
| 2015/0297033 A1 * | 10/2015 | Wong | A47J 42/50 |
| | | | 241/101.3 |
| 2016/0128514 A1 | 5/2016 | Merl et al. | |
| 2016/0220068 A1 | 8/2016 | Naden et al. | |
| 2018/0178367 A1 | 6/2018 | Benson et al. | |
| 2018/0215599 A1 | 8/2018 | Mills | |
| 2020/0179886 A1 | 6/2020 | Atinaja | |

FOREIGN PATENT DOCUMENTS

| | | |
|---|---|---|
| DE | 202005000438 U1 | 10/2005 |
| DE | 202007007947 U1 | 11/2007 |
| DE | 202012006296 U1 | 10/2012 |
| EP | 0956797 A1 | 11/1999 |
| EP | 1086925 A1 | 3/2001 |
| EP | 1707091 A1 | 10/2006 |
| EP | 1529473 B1 | 5/2007 |
| EP | 2193734 A1 | 6/2010 |
| EP | 2116162 B1 | 6/2012 |
| EP | 2394548 B1 | 11/2013 |
| EP | 2465396 B1 | 12/2014 |
| EP | 2623001 B1 | 7/2015 |
| EP | 3116362 B1 | 7/2017 |
| EP | 2962609 B1 | 2/2019 |
| EP | 3005918 B1 | 5/2019 |
| EP | 3138450 B1 | 12/2019 |
| EP | 3338604 B1 | 2/2020 |
| FR | 2953208 B1 | 6/2011 |
| GB | 2348638 B | 2/2001 |
| KR | 20080000784 A | 1/2008 |
| KR | 20170033818 A | 3/2017 |
| KR | 20200007749 A | 1/2020 |
| WO | 2000028870 A2 | 5/2000 |
| WO | 2014124859 A1 | 8/2014 |
| WO | 2016172836 A1 | 11/2016 |
| WO | 2017018624 A1 | 2/2017 |

OTHER PUBLICATIONS

Extended EP Search Report, dated Aug. 22, 2022, for related EP application No. 22153818.4-1016/4049564.

* cited by examiner

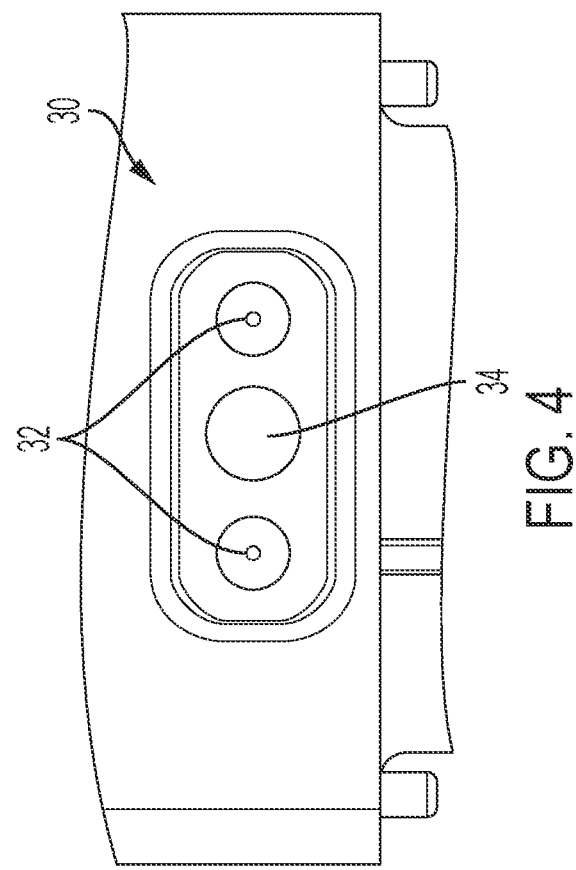

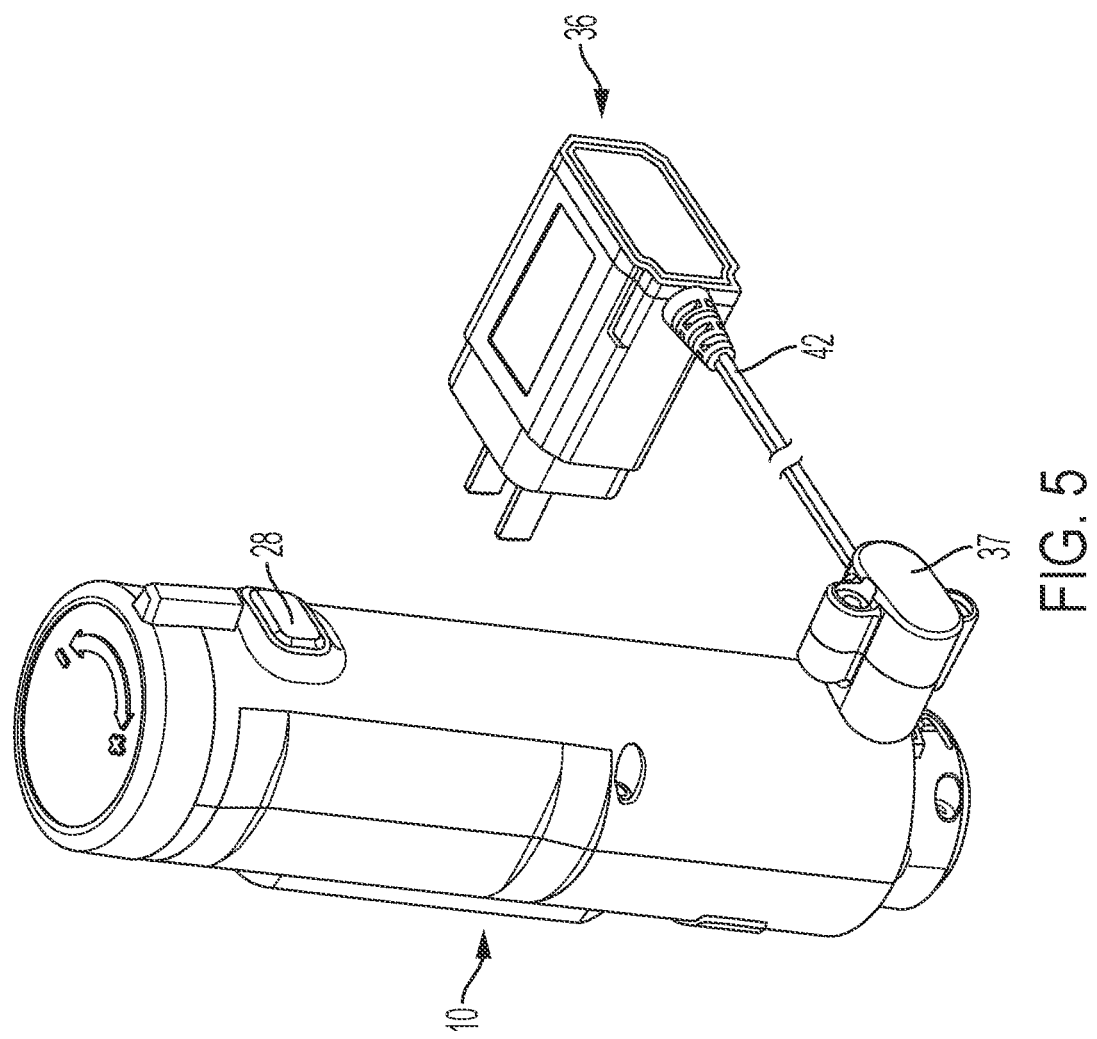

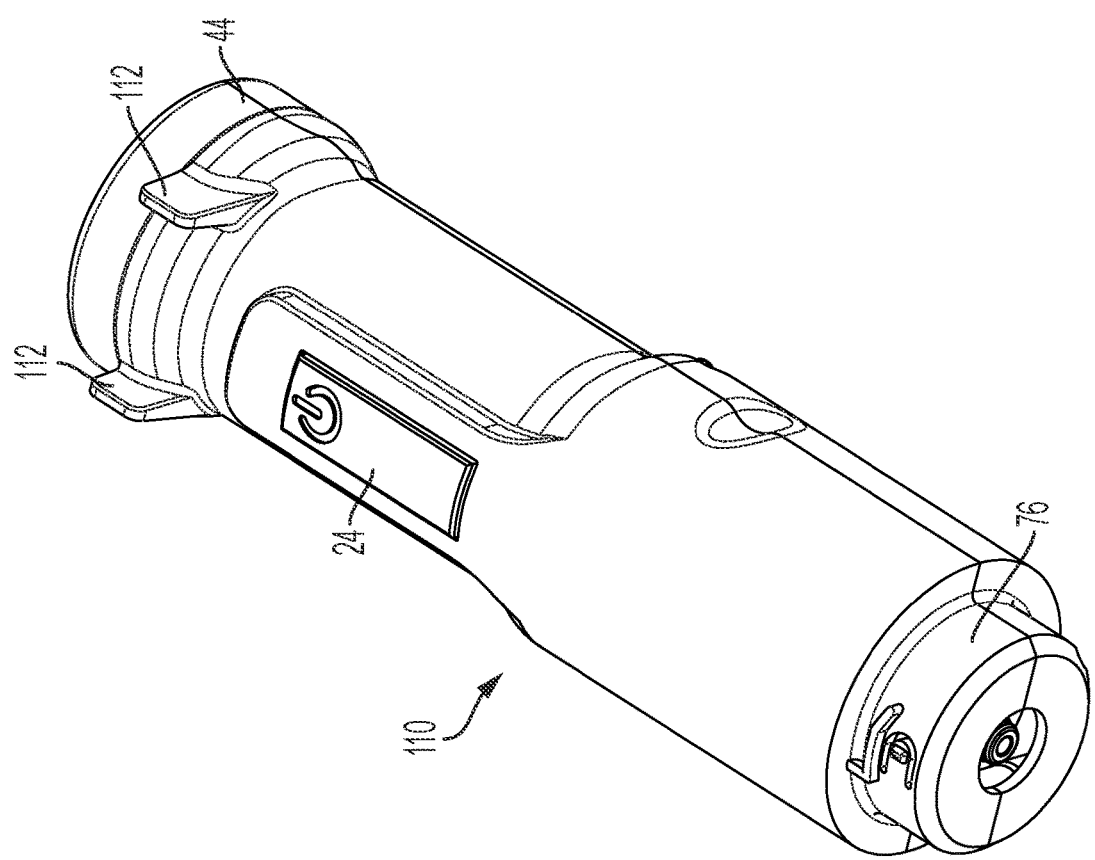

MODULAR HAND-HELD KITCHEN APPLICANCE

FIELD OF THE INVENTION

This application is directed to a system of hand-held kitchen appliances having a single powerhead capable of being attached to a variety of kitchen appliances. Examples of such attachments include, but are not limited to a blender, a whisker, a wine opener, a can opener, and a spice grinder.

BACKGROUND OF THE INVENTION

This section provides background information related to the present disclosure which is not necessarily prior art.

Modular hand-held kitchen appliances are known in the art. These products are typically built around an immersion blender as the main product. The products then include several simple attachments, such as a whisk or milk frother, to provide additional functions to the consumer. While these added attachments provide increased convenience to the consumer, the lack of other attachments and versatility prevent them from being a complete, modular, kitchen multitool.

BRIEF SUMMARY OF THE INVENTION

Therefore, a modular kitchen multitool of the present invention aims to provide a powered solution to a wide variety of kitchen tasks beyond what is currently available. These attachments go beyond simple mixing and blending and extend to other areas of the kitchen such as spice grinding and wine opening. In addition to the variety of attachments, the present multitool is battery powered to give consumers added convenience as they work around the kitchen.

In accordance with one aspect of the invention, the multitool includes a powerhead having a motor and rechargeable battery capable of powering a variety of different attachments. In a first embodiment of the powerhead, the rotational direction of the motor can be reversed and its speed changed to provide operational flexibility for the attachments. A quick release mechanism provides for quick and easy locking of the different attachments and a sensor identifies the attachment to automatically adjust the operational characteristics.

In a second embodiment of the powerhead, the motor reverse and speed change features are removed to provide a simpler and more cost effective design. With this powerhead, the attachment itself incorporates any desired features needed for operation.

In another aspect of the invention, a dual spice grinder attachment is disclosed that is capable of use with the powerhead. The spice grinder includes two separate chambers for holding two different spices. The grinder includes a gearing mechanism that allows for the selection of one of the two spices to be ground, without having to reverse the direction of the motor. This is different from existing dual spice grinder which normally reverse the motor direction to switch between the two spices.

In yet another aspect of the invention, a wine opener attachment is disclosed that removes a cork from a bottle, and then automatically ejects the cork from the opener. The wine opener includes a spring that is compressed as the cork is removed from the bottle. After the cork is fully removed, the force of the spring pushes the cork so it unwinds off the corkscrew. This is in contrast to typical wine openers that operate the motor in a first direction to drive the corkscrew into the cork, and then reverse the motor to unwind the cork off the corkscrew.

Further areas of applicability will become apparent from the description provided herein. The description and specific examples in this application are intended for purposes of illustration only and are not intended to limit the scope of the present disclosure.

BRIEF DESCRIPTION OF THE INVENTION

Figure 3:
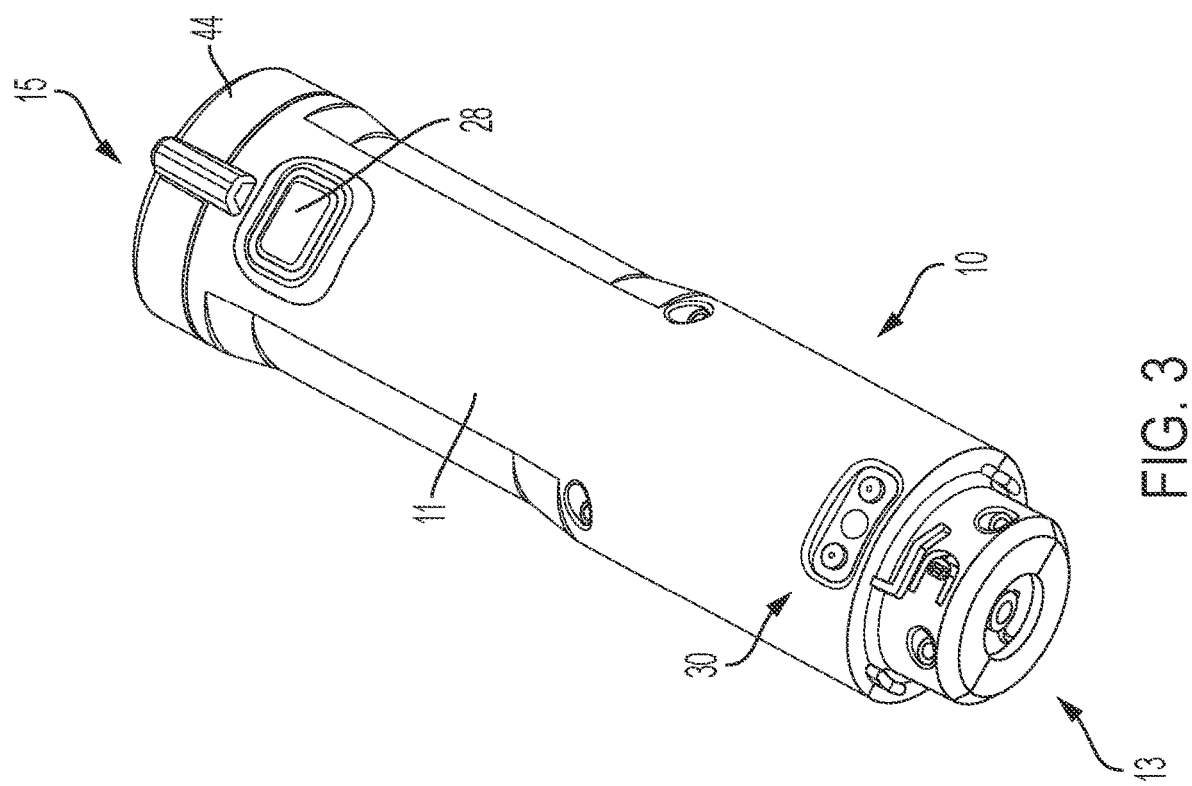
Figure 2:
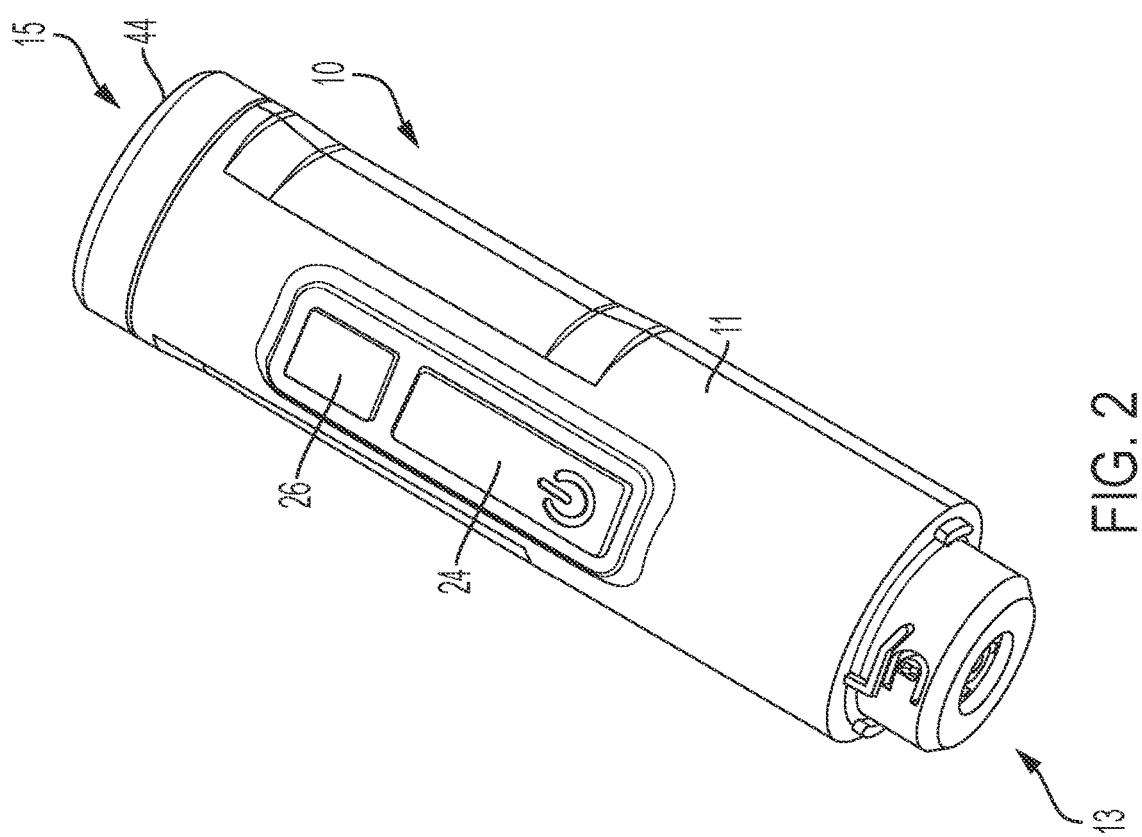
Figure 7:
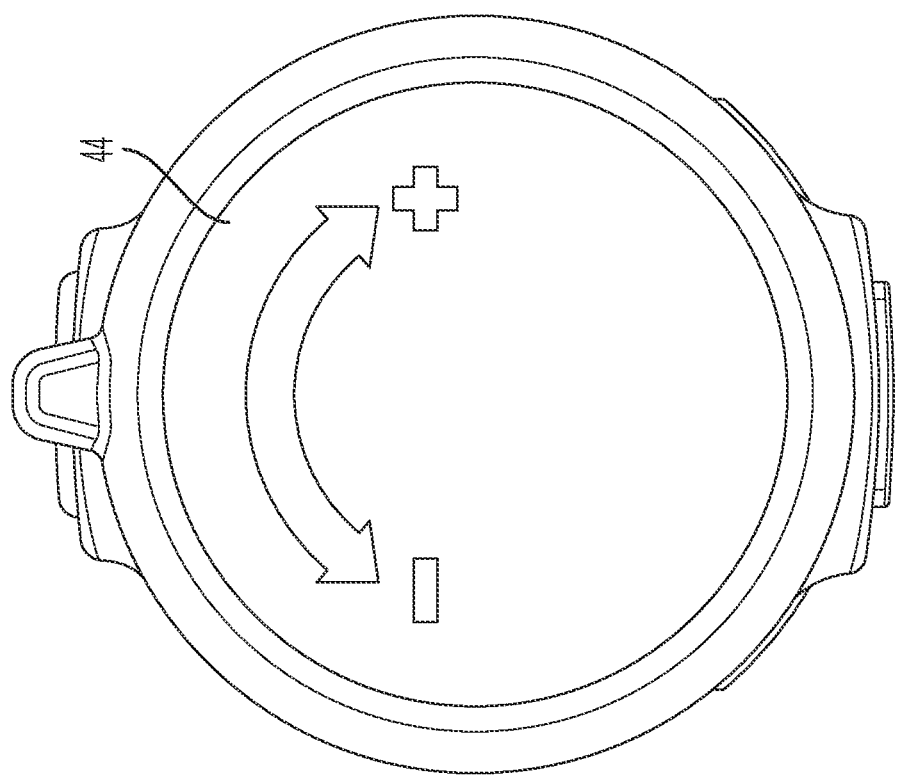
Figure 9:
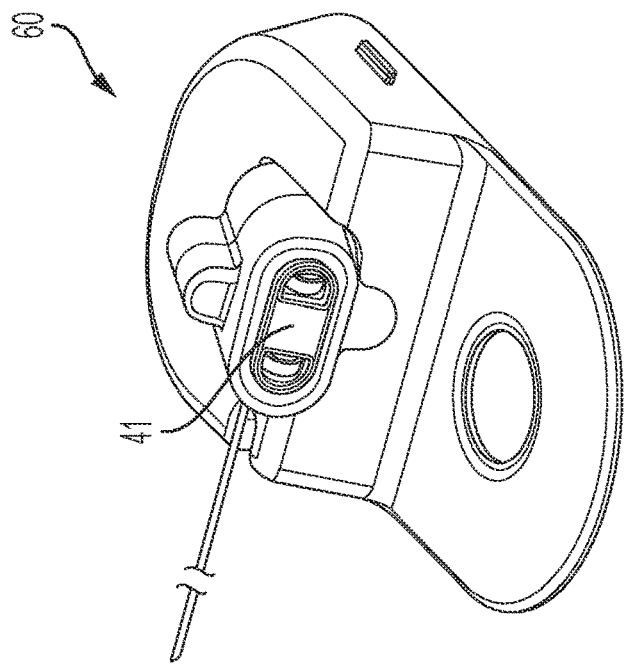
Figure 8:
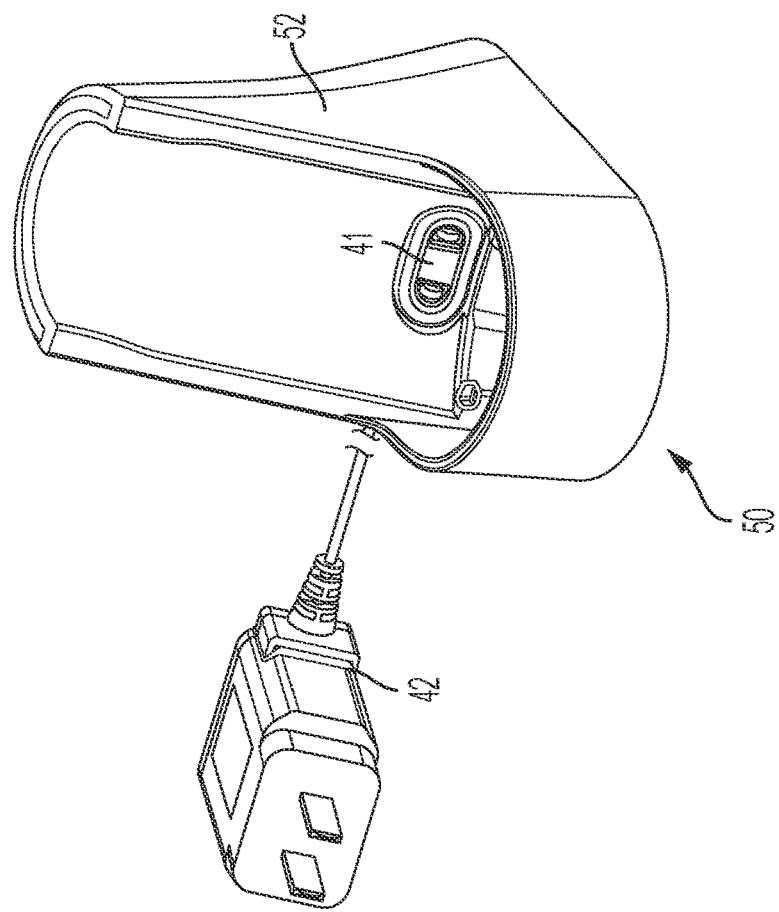
Figure 8A:
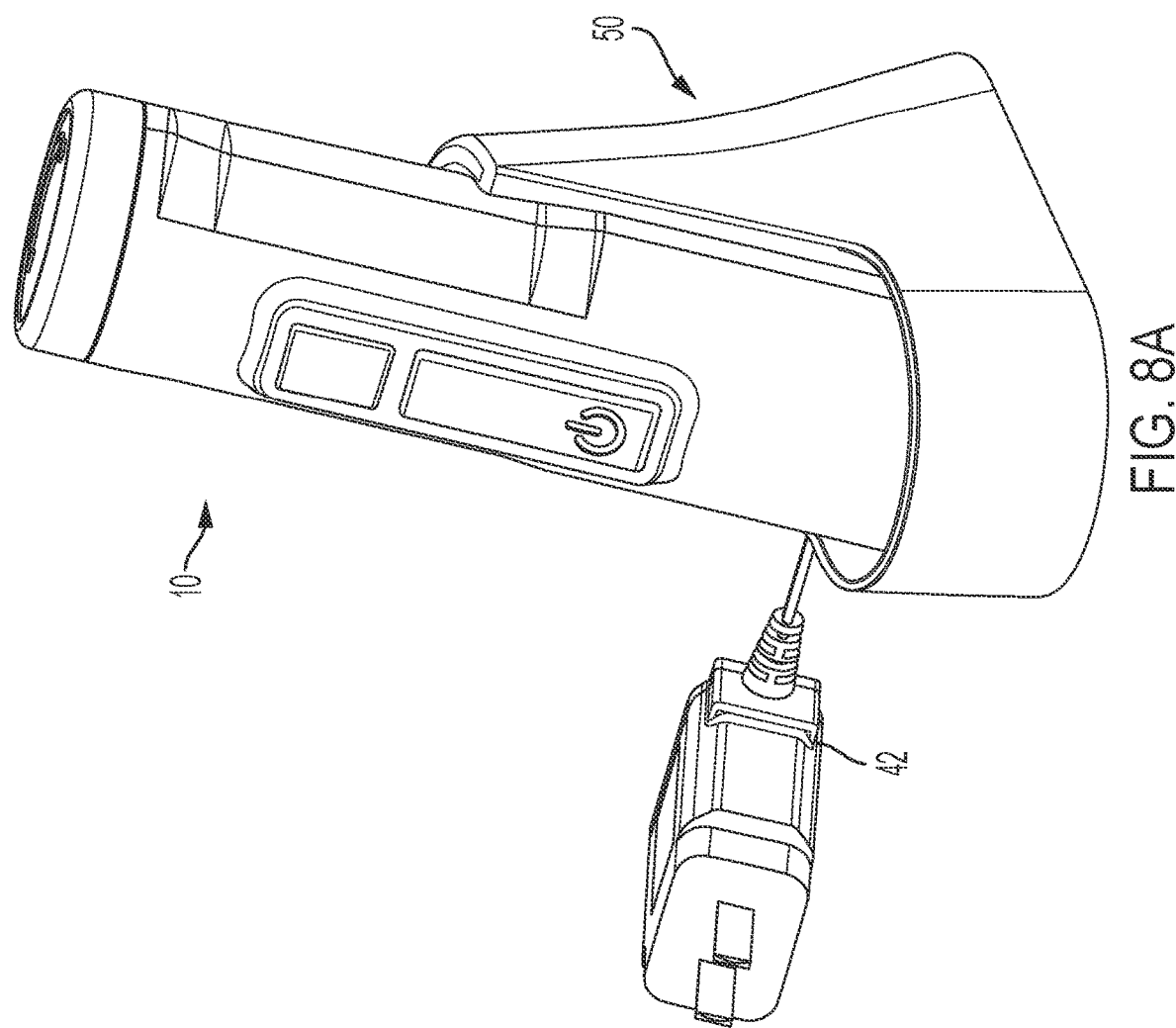
Figure 10:
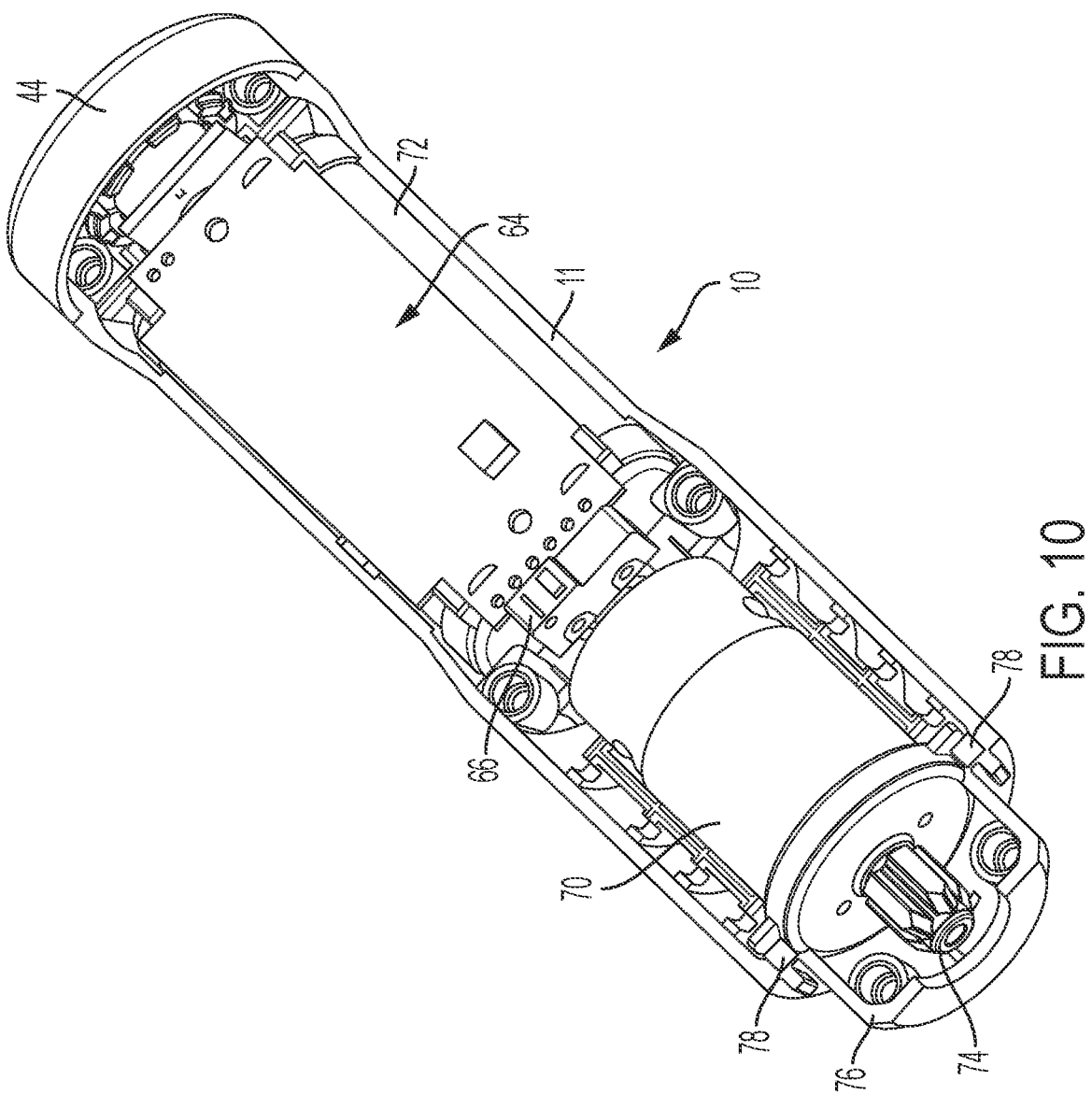
Figure 11:
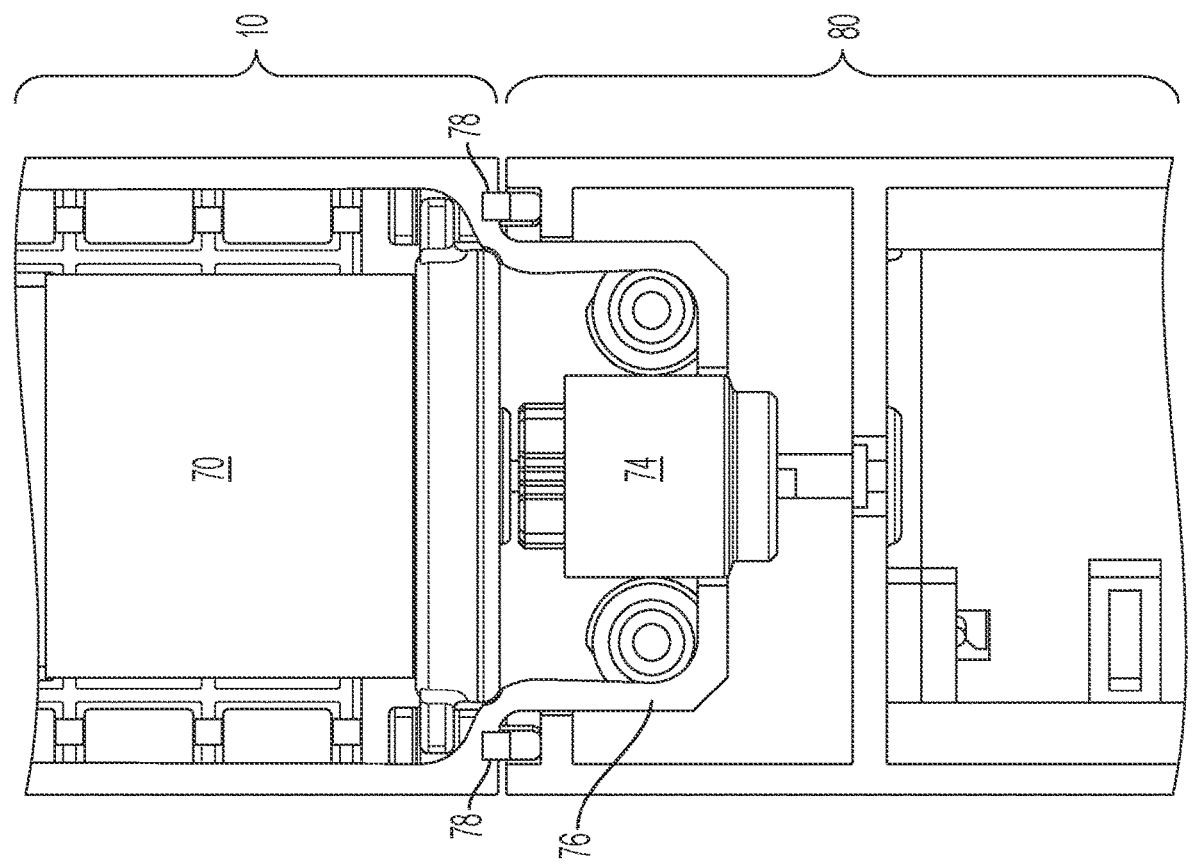
Figure 12:
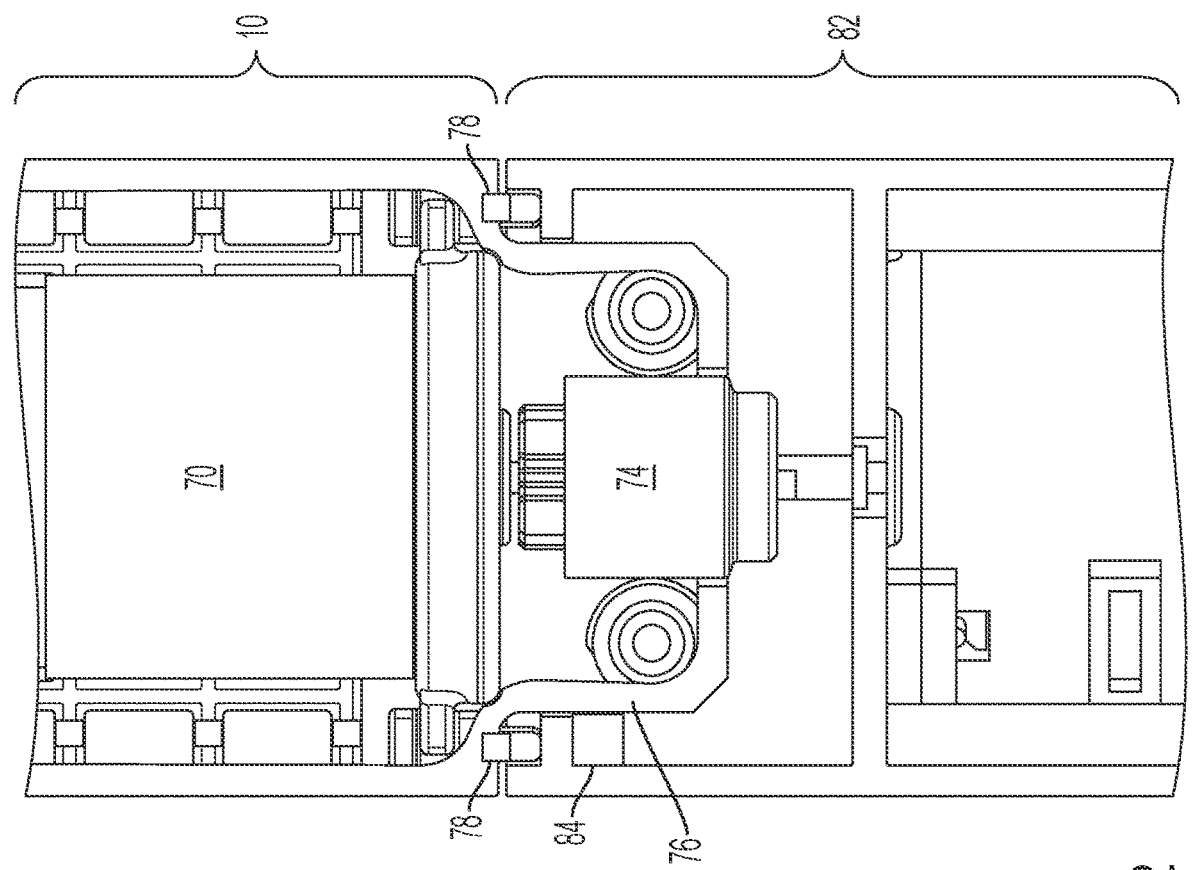
Figure 13:
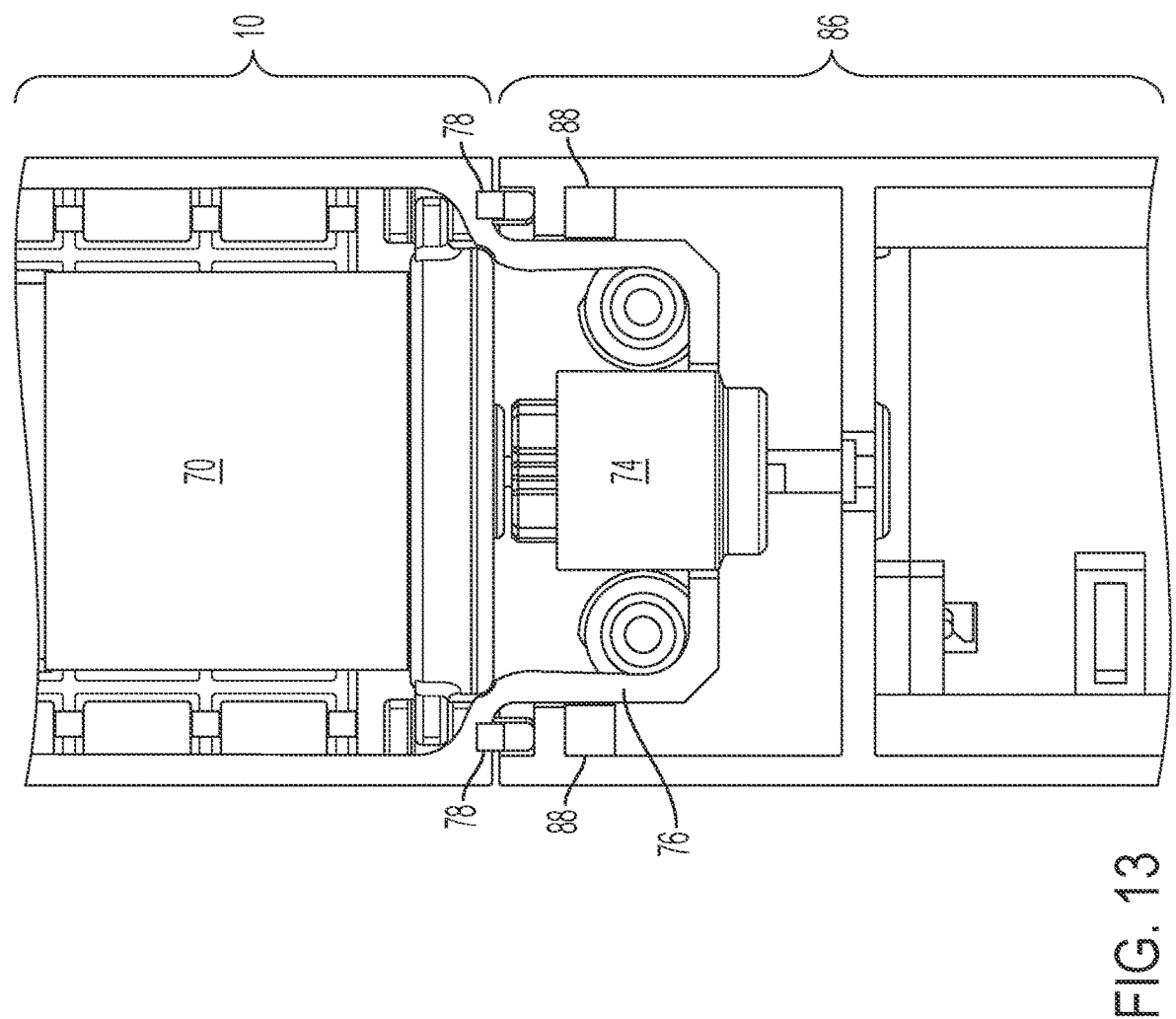
Figure 14:
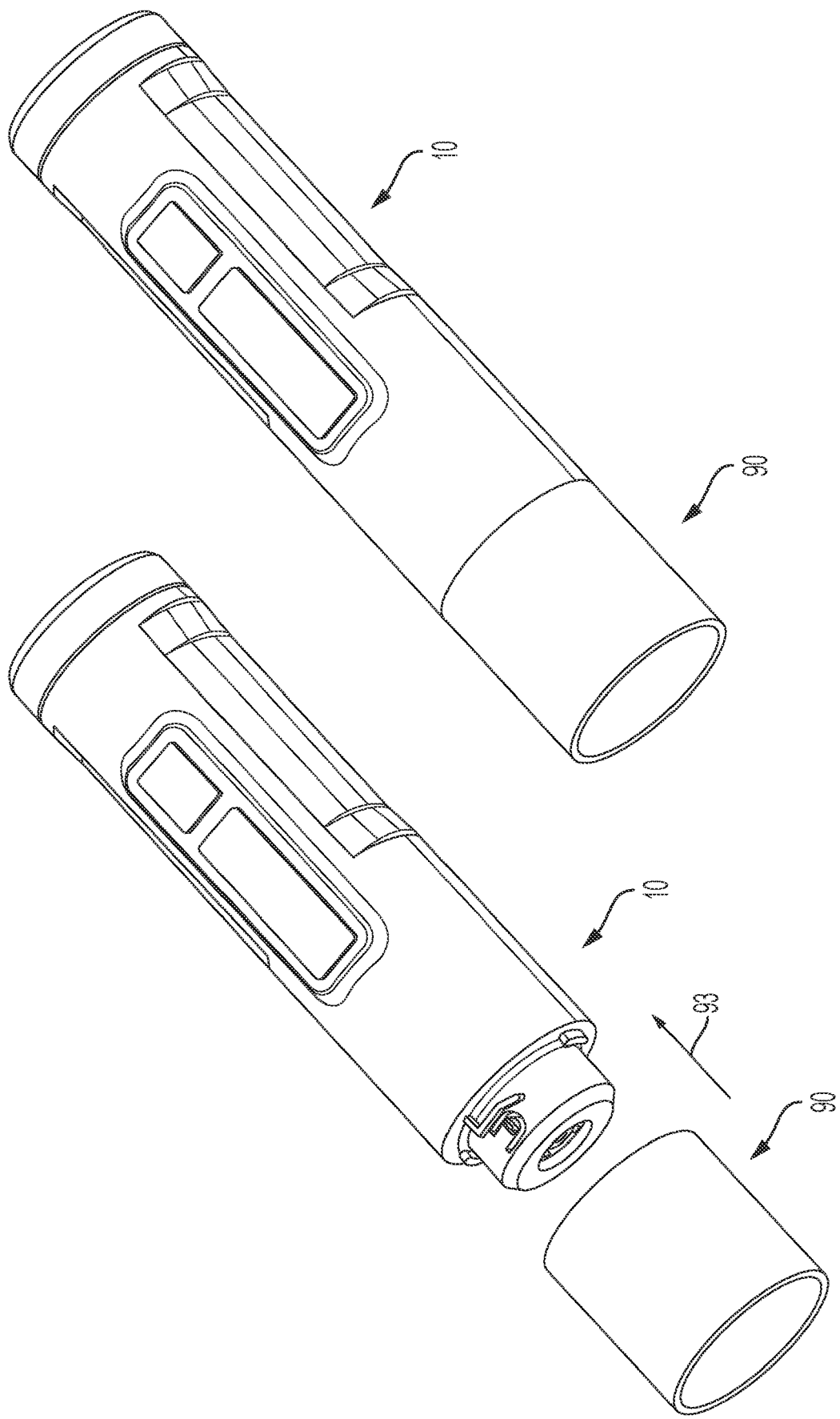
Figure 15:
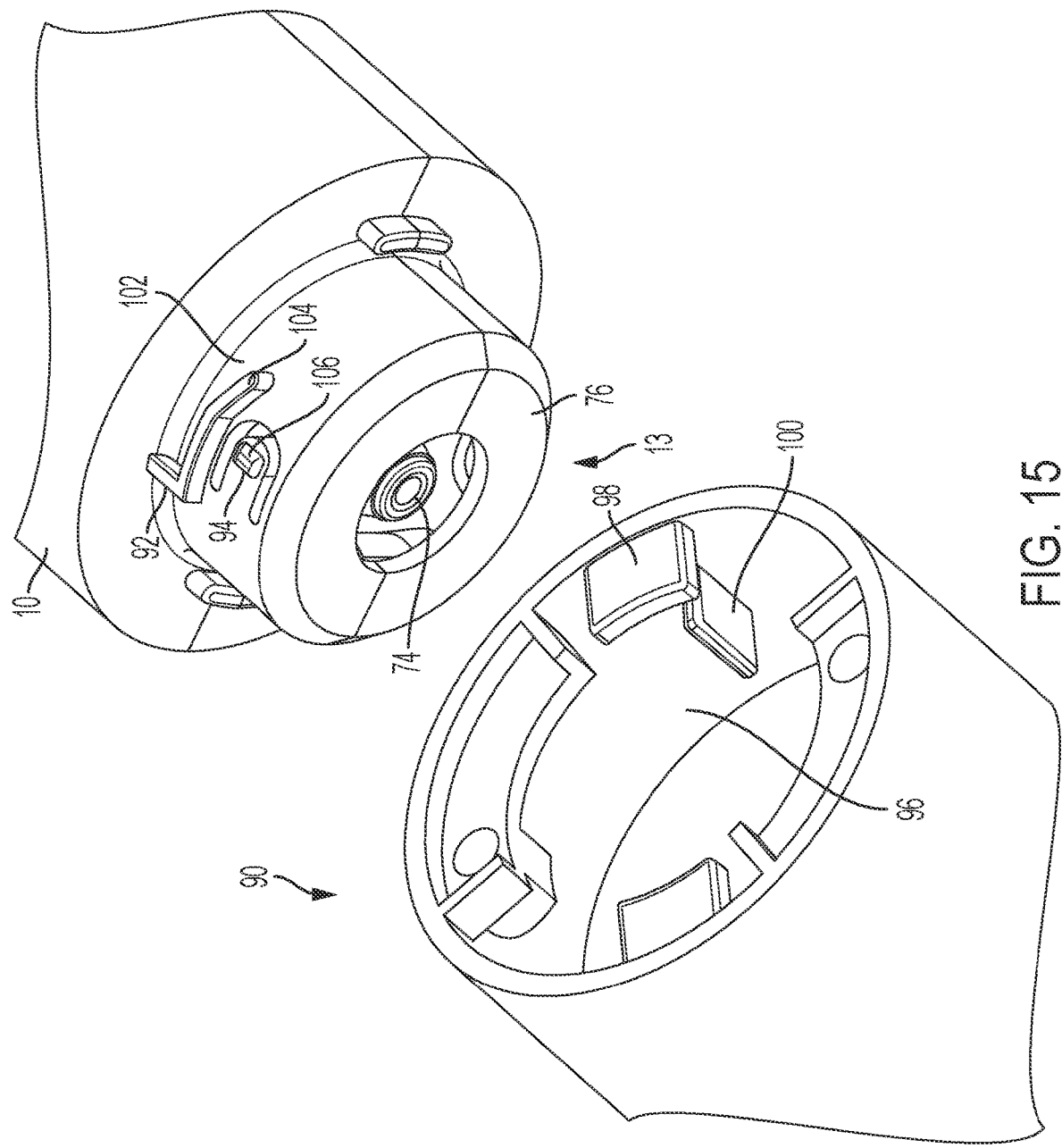
Figure 17:
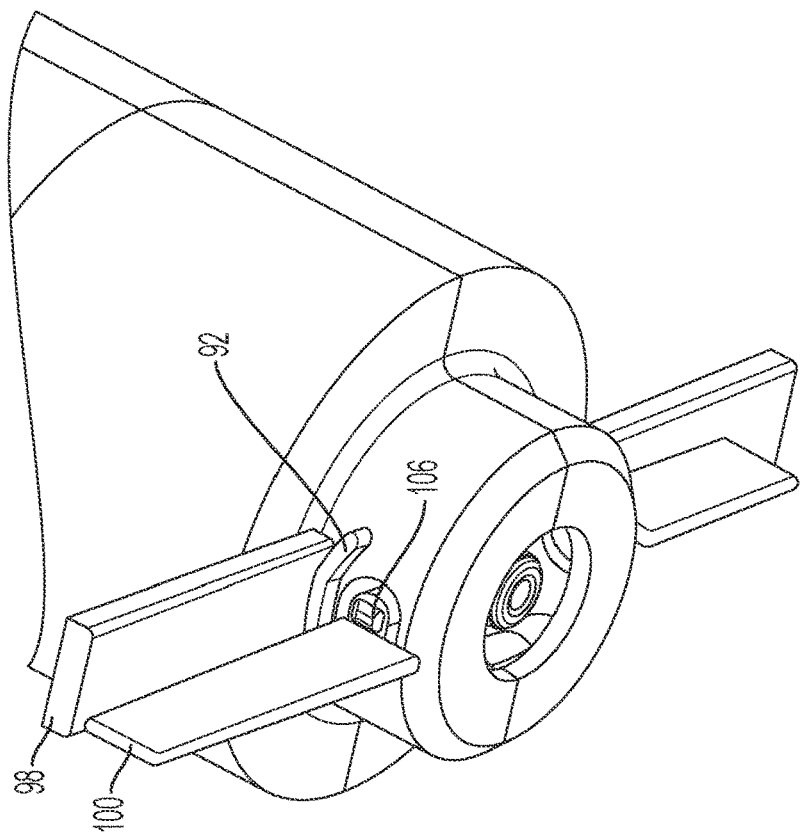
Figure 16:
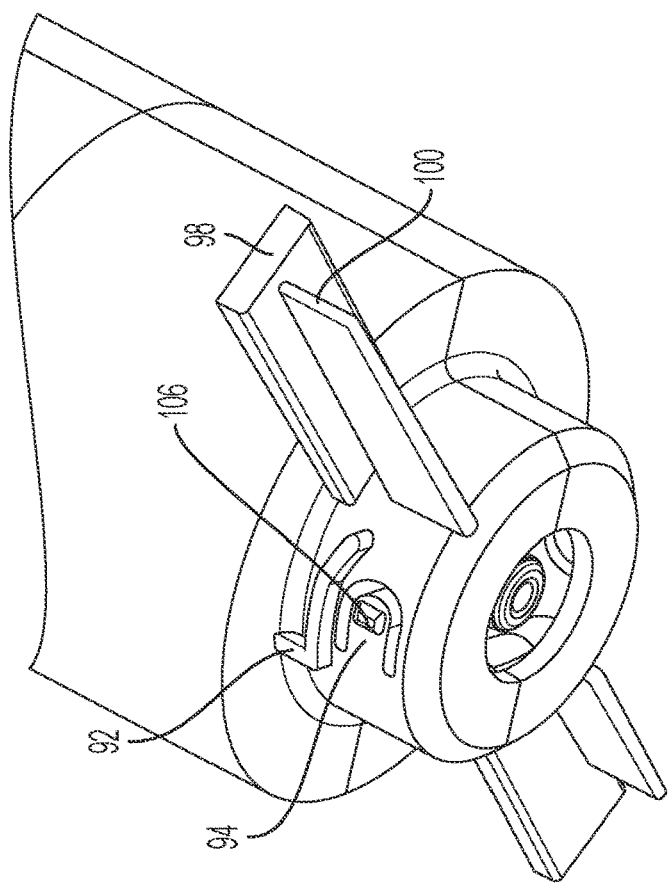
Figure 19:
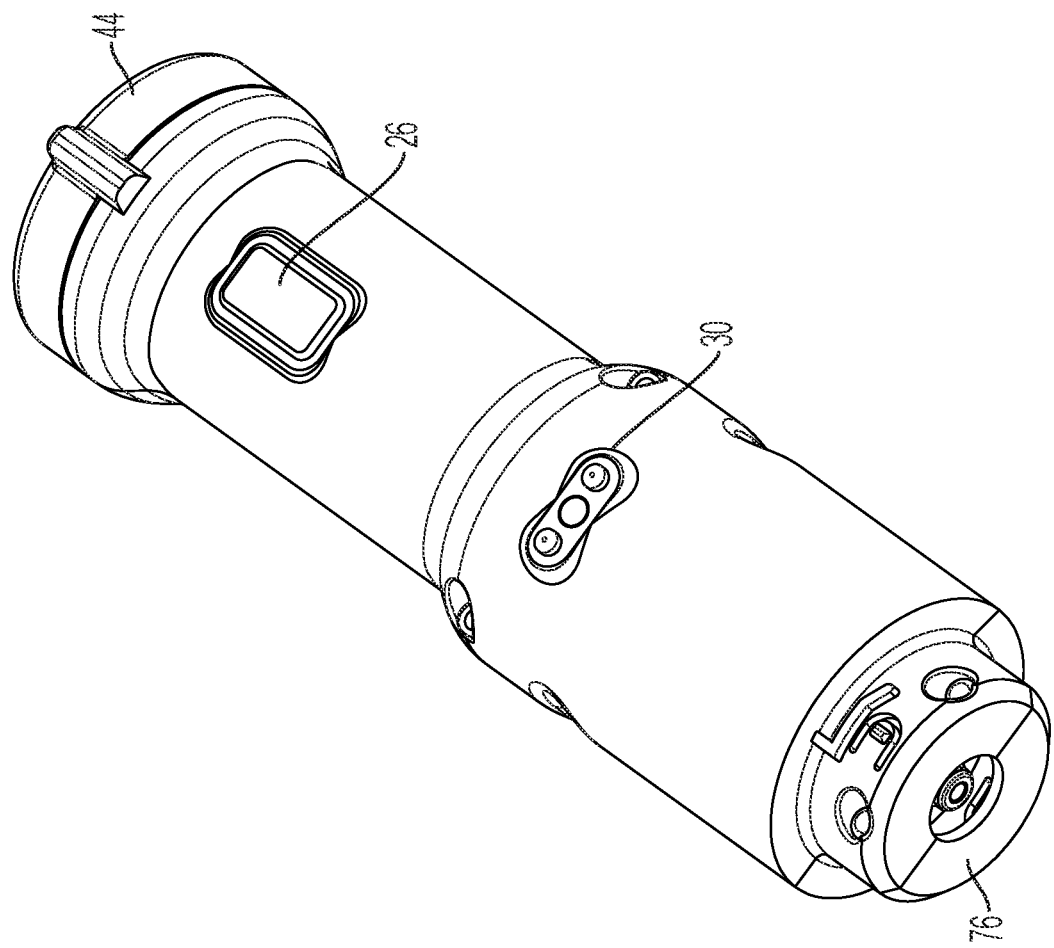
Figure 22:
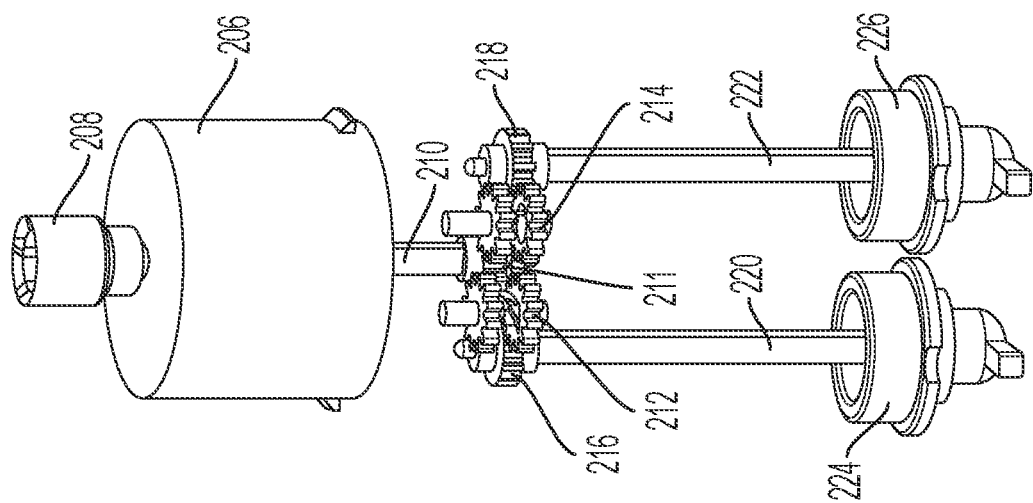
Figure 21:
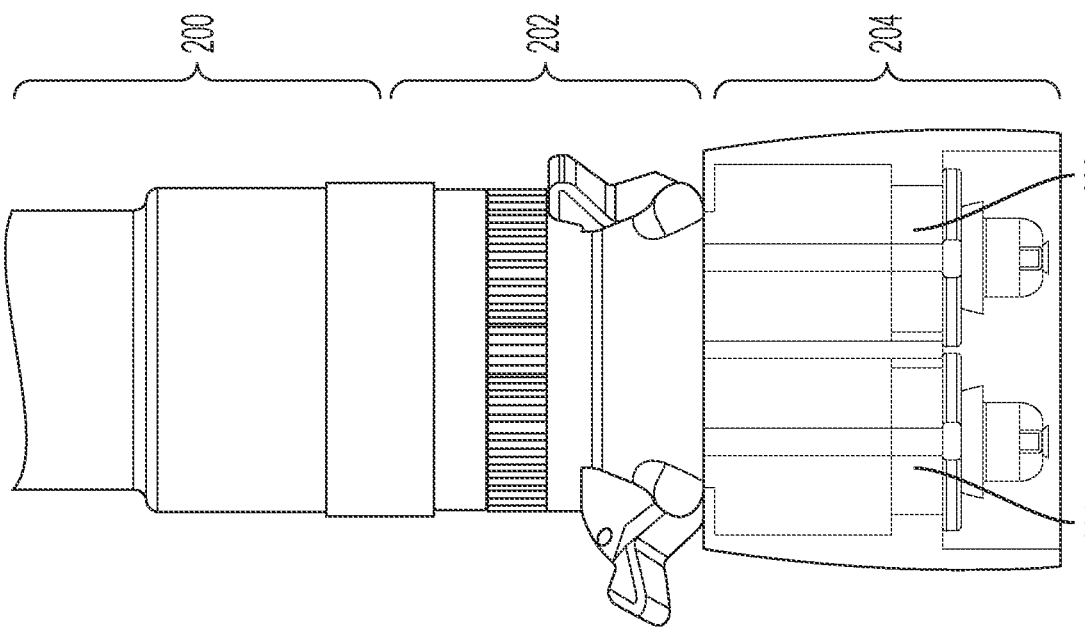
Figure 20:
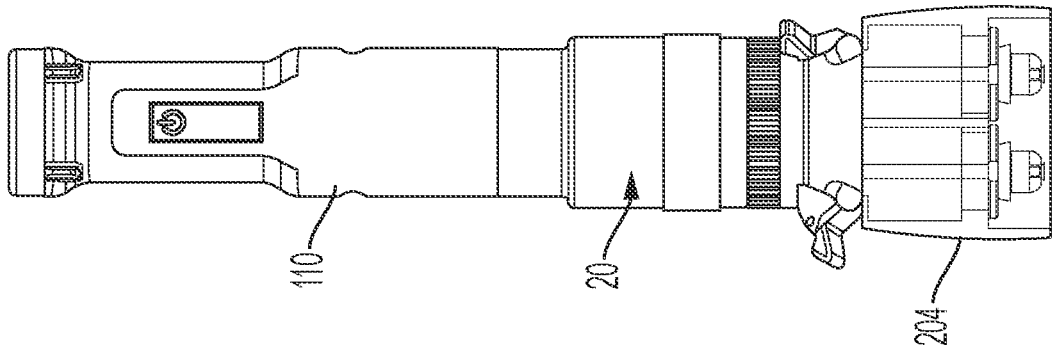
Figure 24:
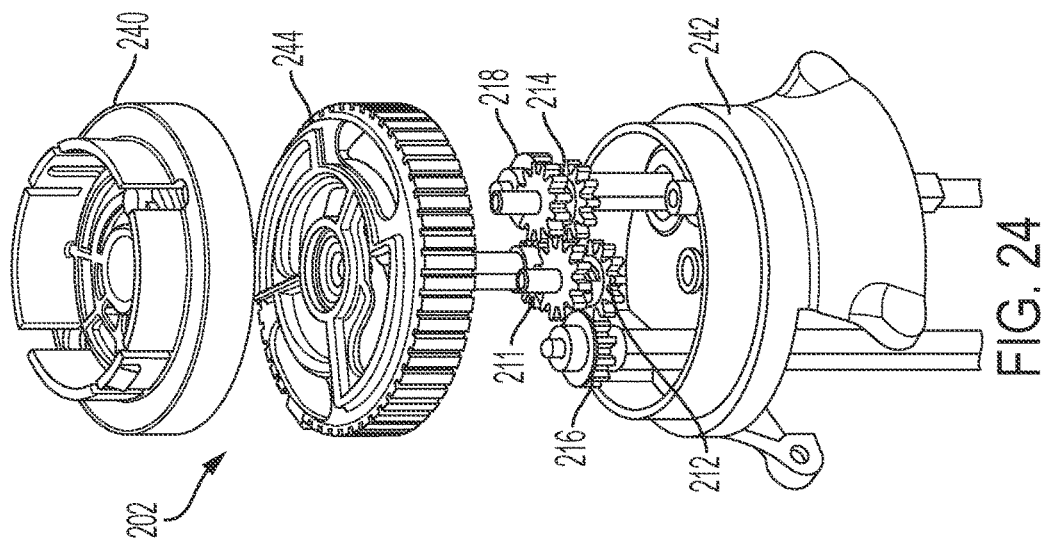
Figure 23:
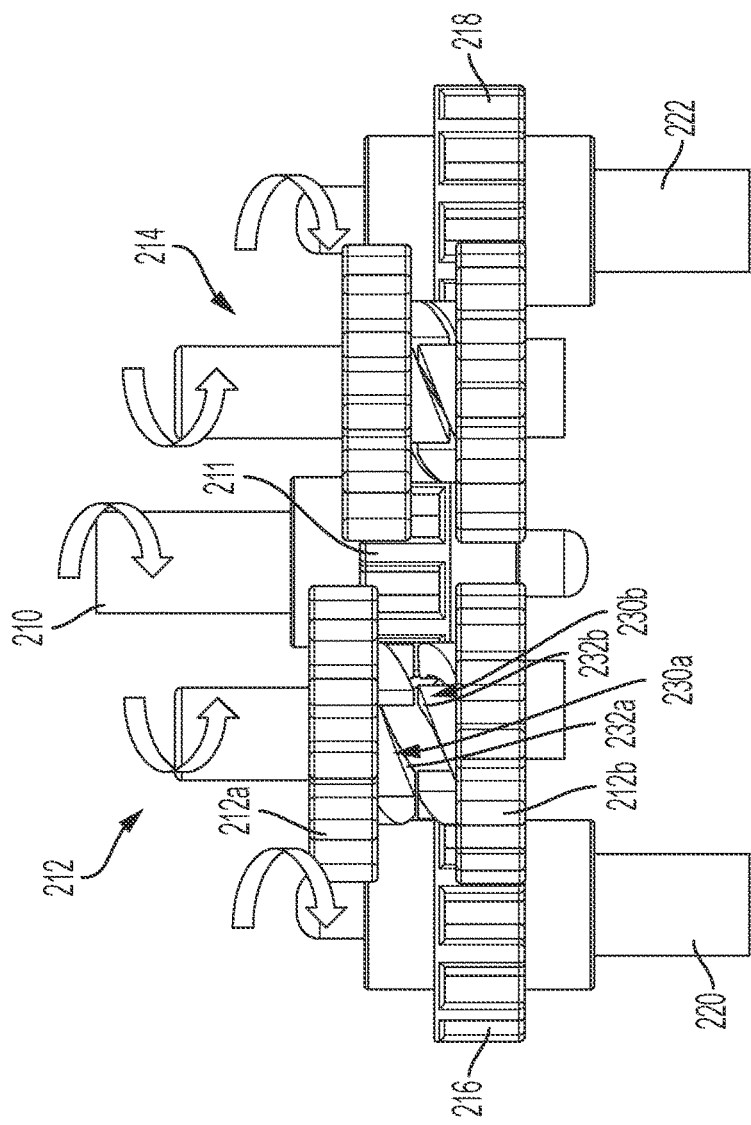
Figure 26:
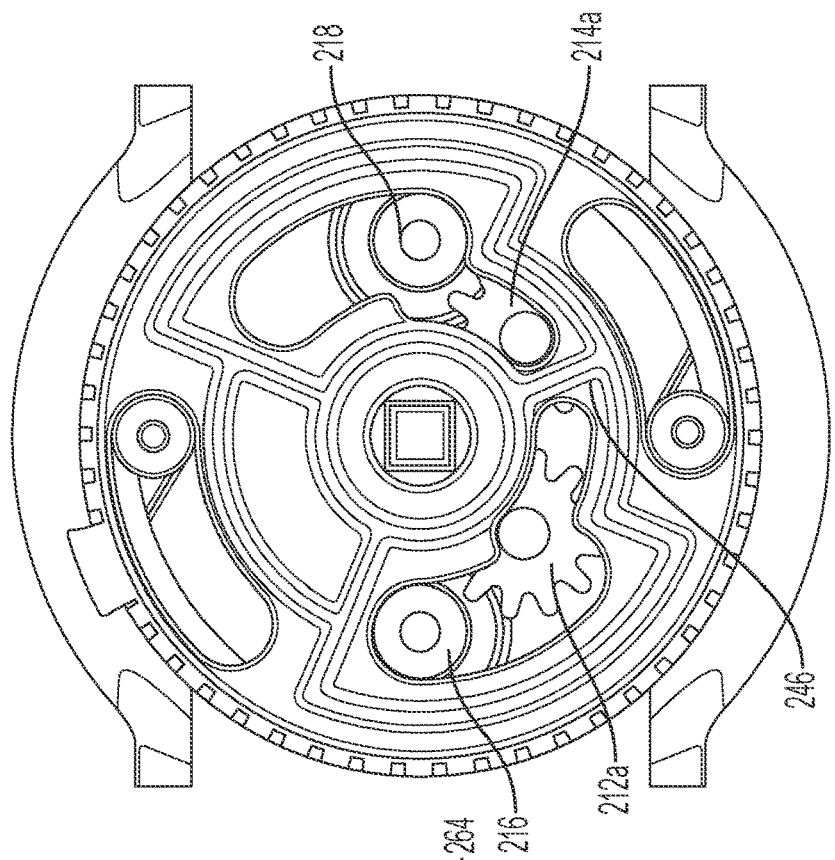
Figure 25:
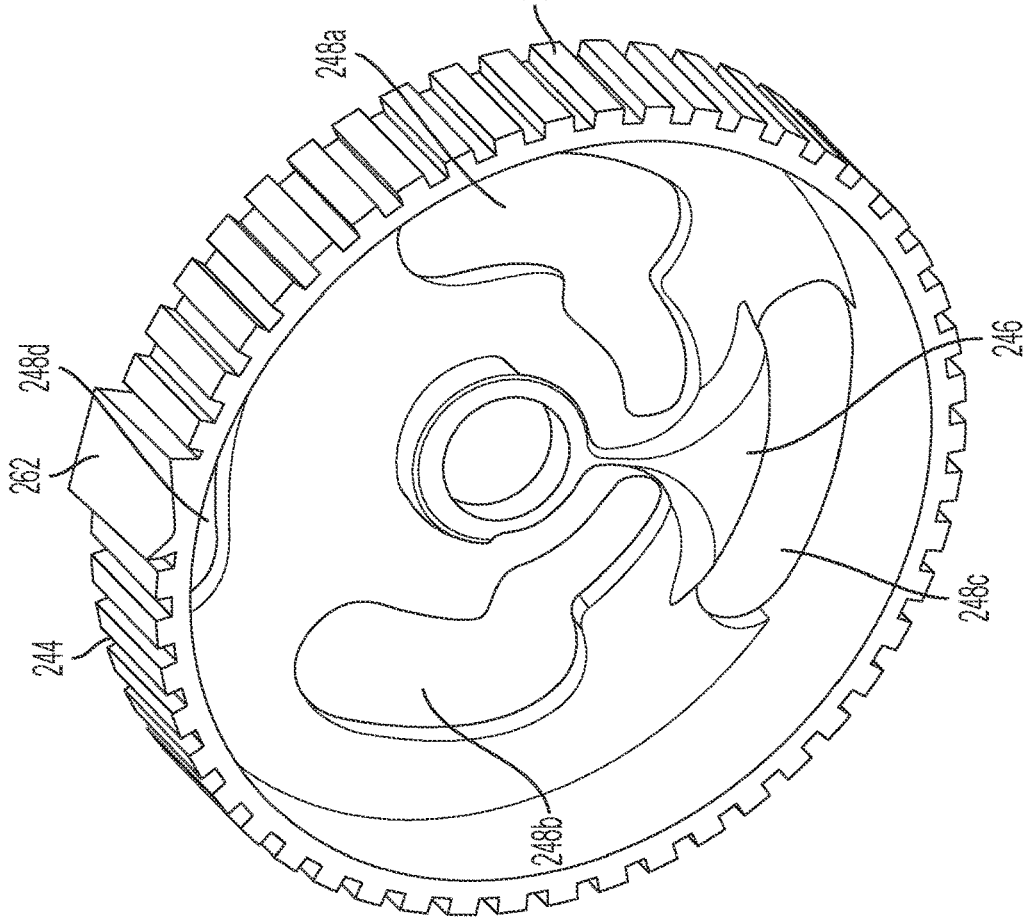
Figure 27:
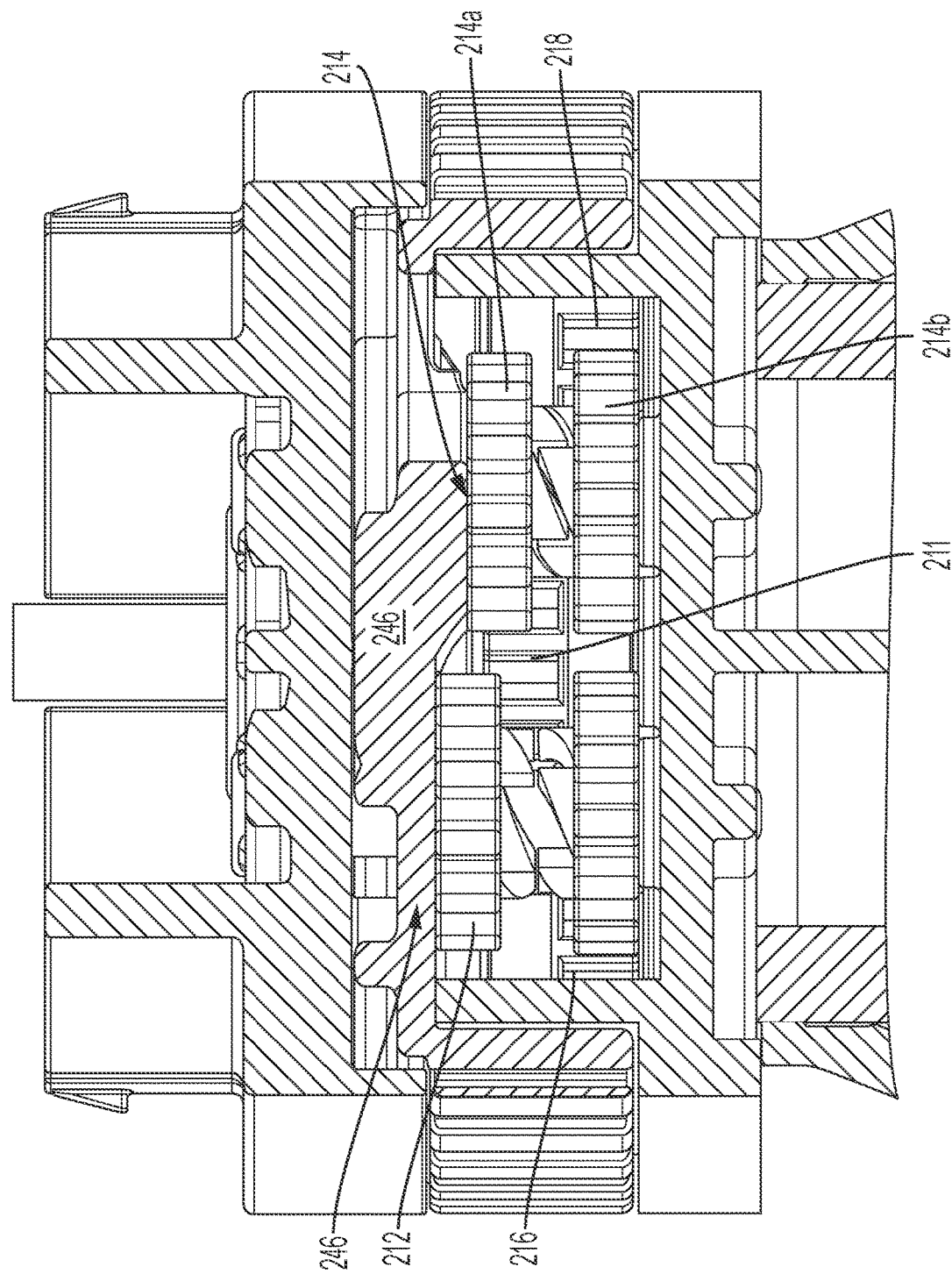
Figure 29:
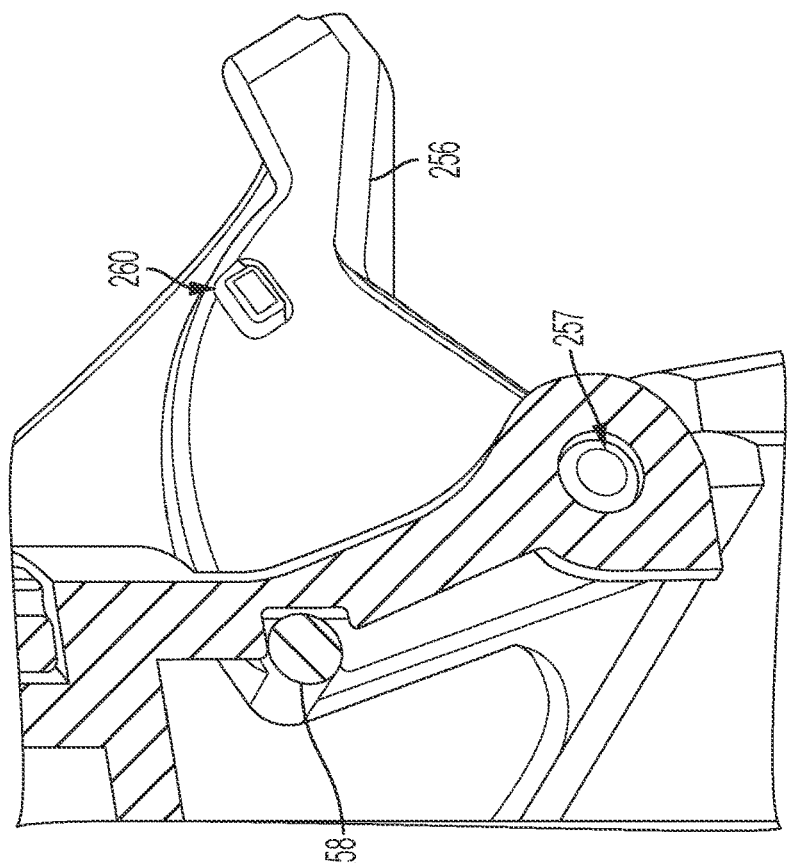
Figure 28:
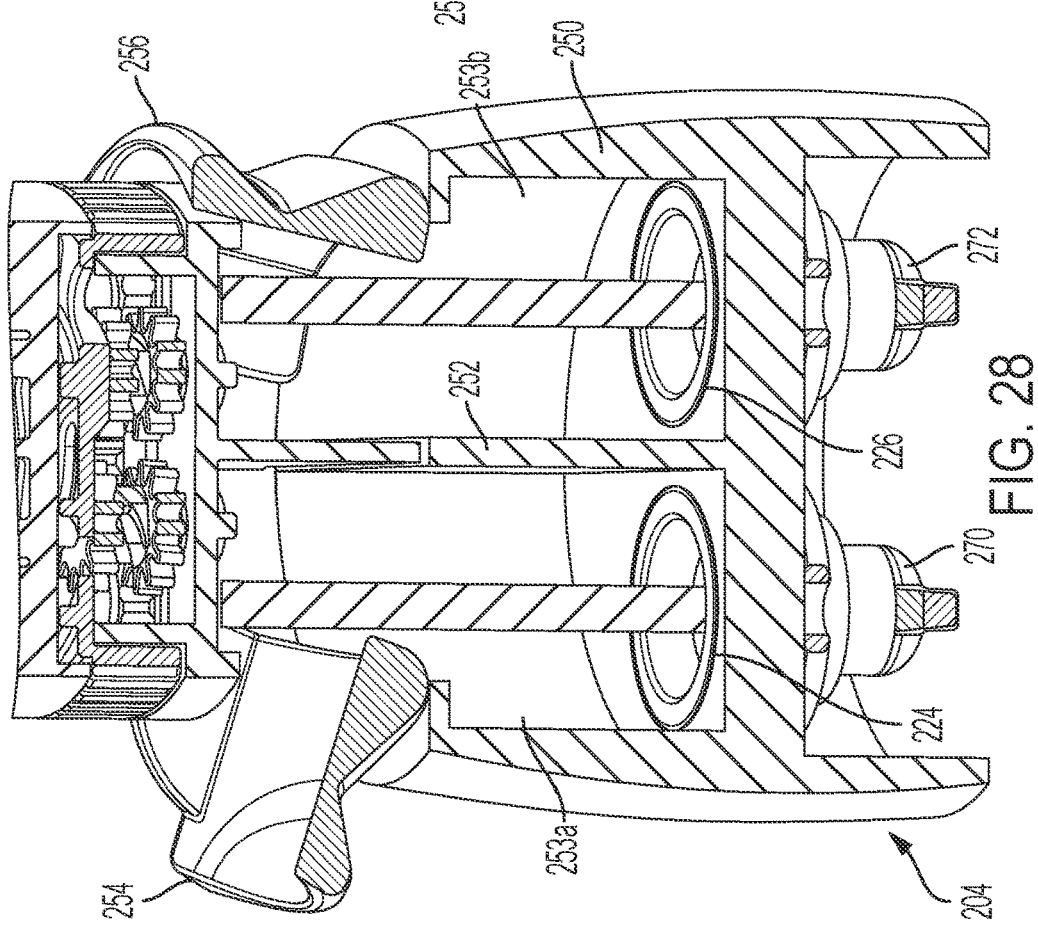
Figure 32:
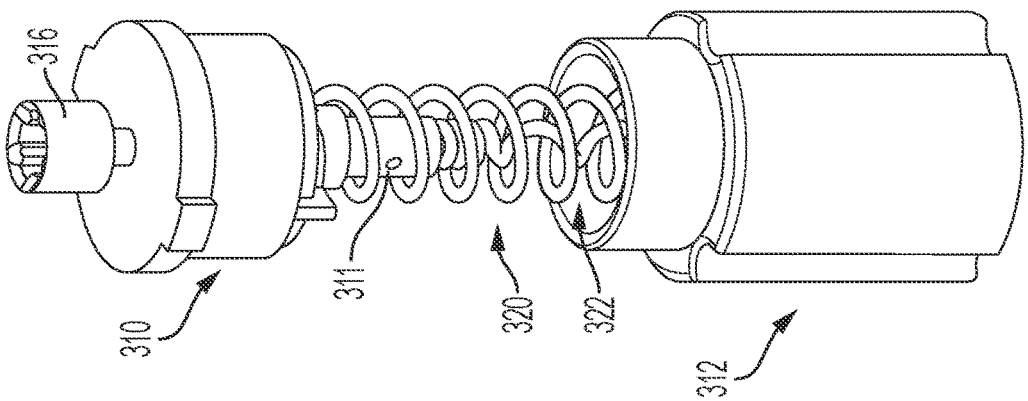
Figure 31:
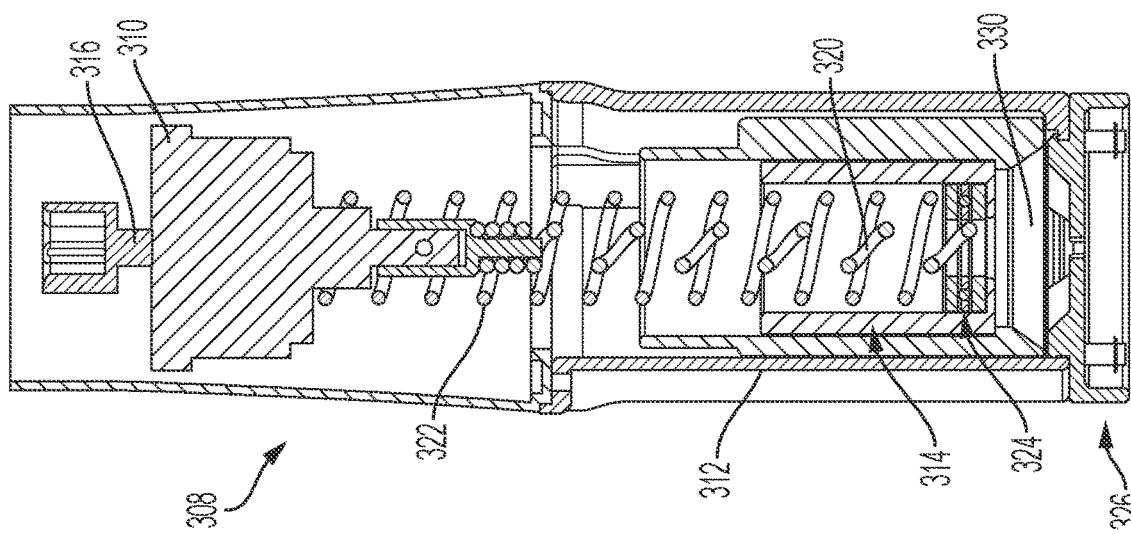
Figure 30:
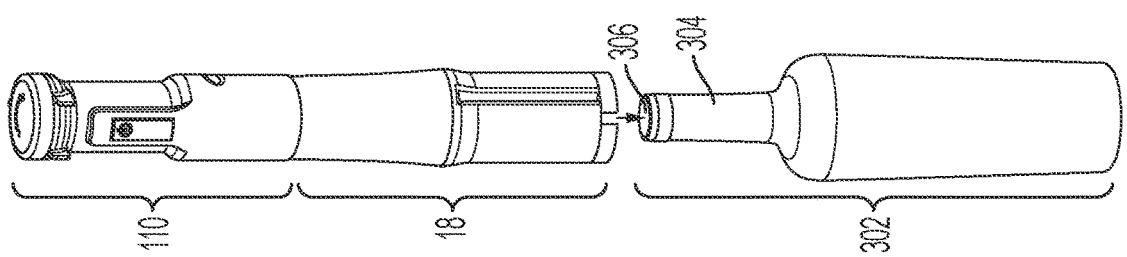
Figure 33:
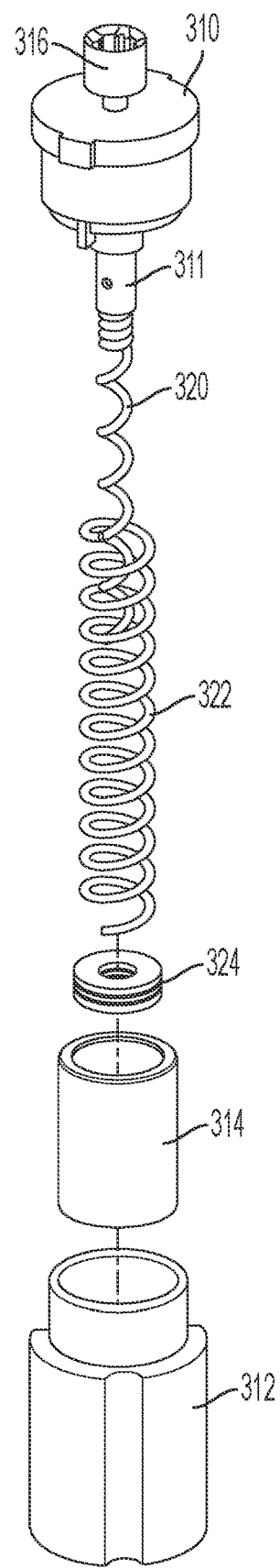
Figure 36:
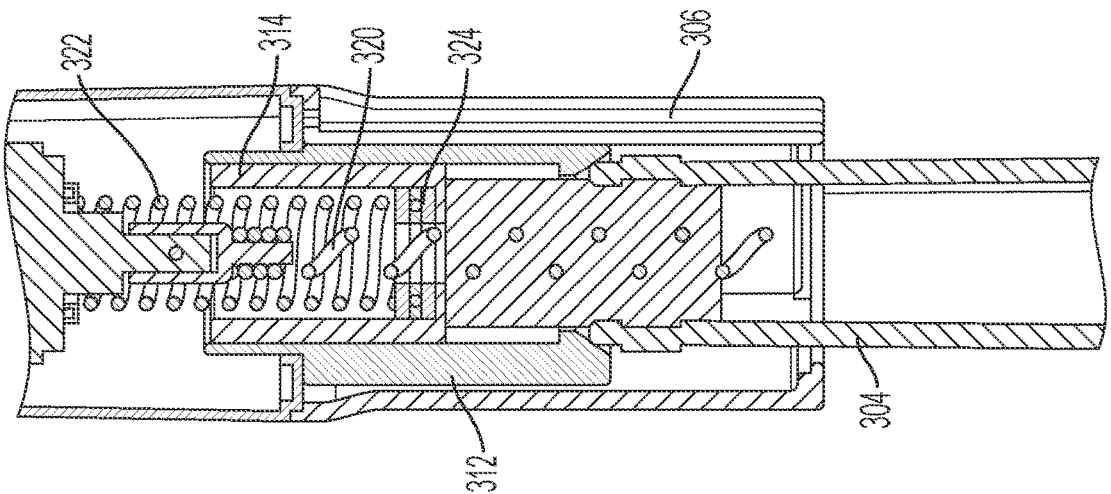
Figure 39:
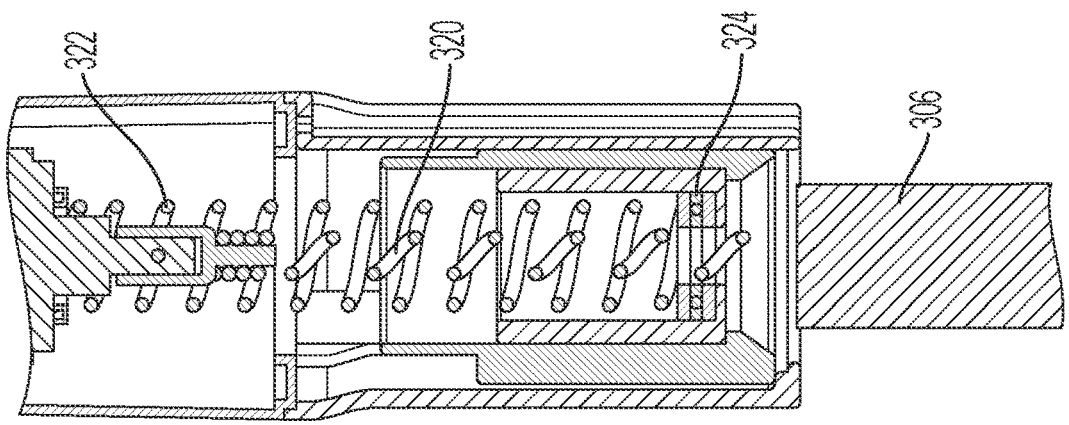
Figure 41:
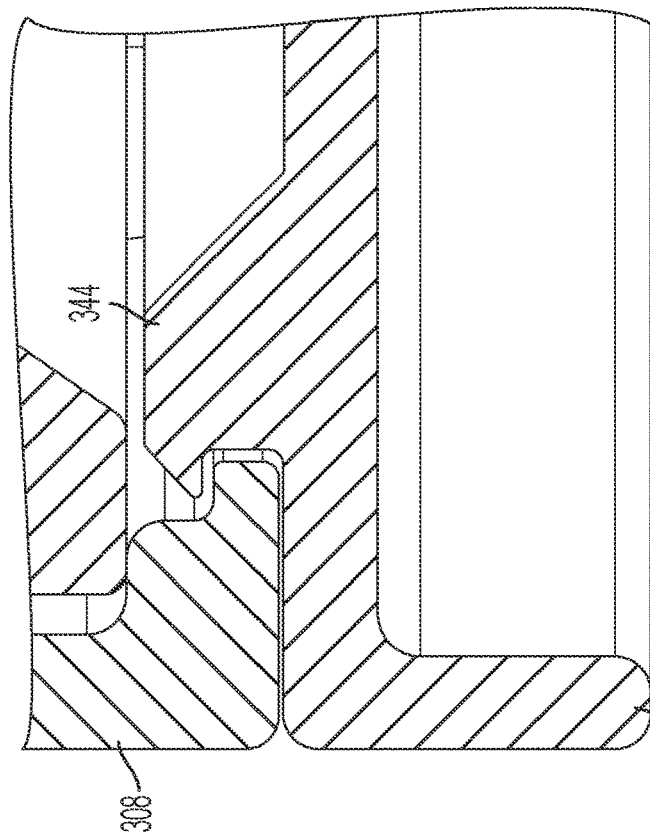
Figure 40:
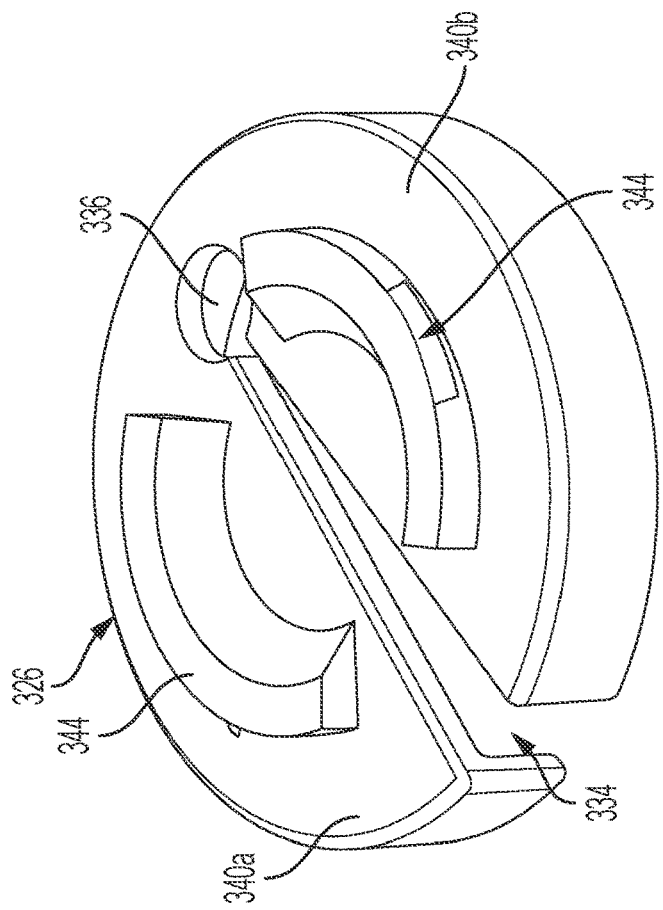
Figure 42:
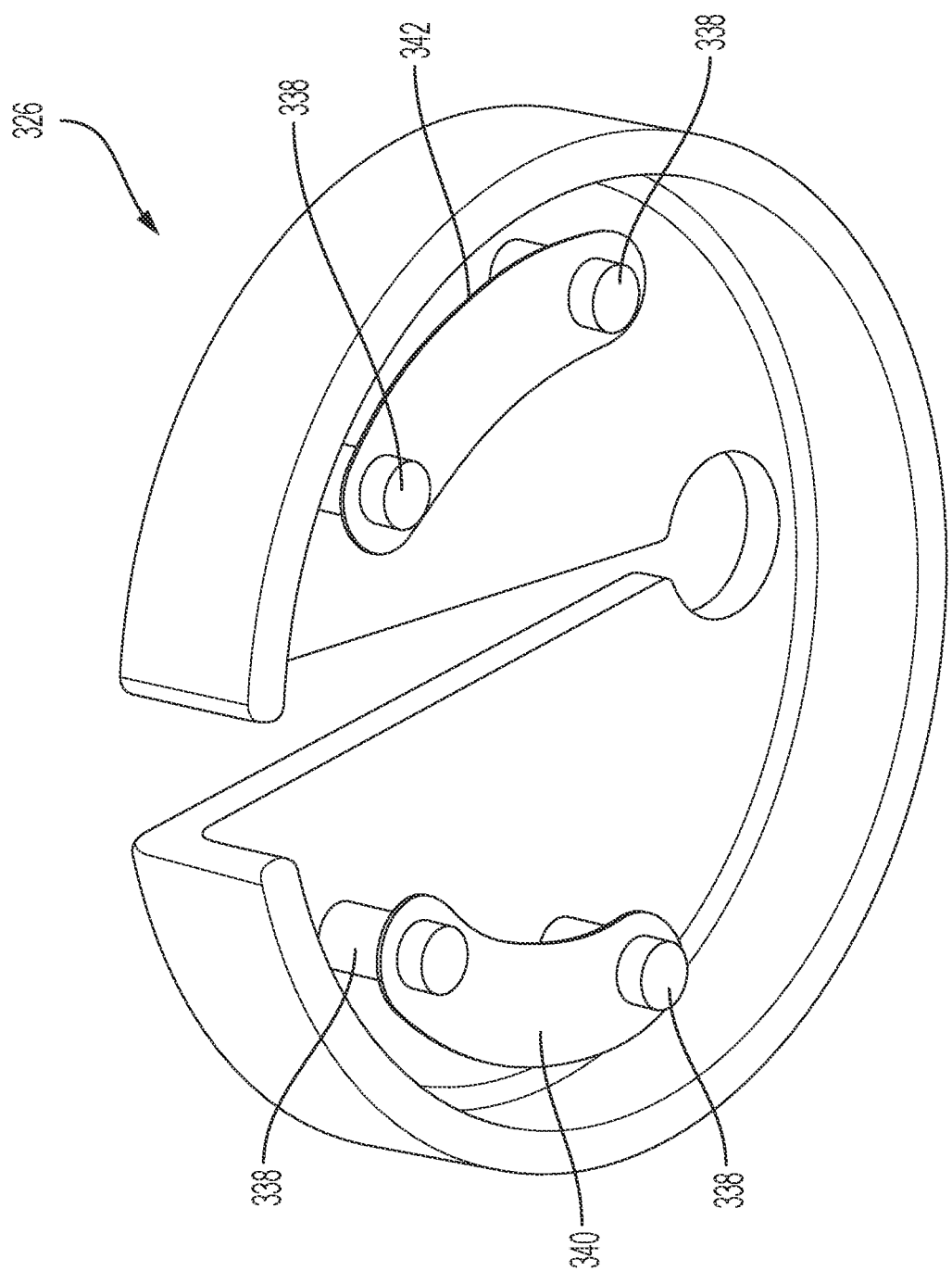

Further features and advantages of the present invention will be better understood by reference to the following description, which is given by way of example and in association with the accompanying drawings, in which:

FIG. 1 shows a powerhead with various attachments;
FIG. 2 is a top view of the powerhead;
FIG. 3 is a bottom view of the powerhead;
FIG. 4 is a view of a charging port on the powerhead;
FIGS. 5, 5A, 5B and 6 show a first embodiment of a charger;
FIG. 7 is a rear view of the powerhead;
FIGS. 8, 8A and 9 show a second embodiment of a charger;
FIG. 10 is an interior view of the powerhead;
FIGS. 11-13 show a sensor assembly for the powerhead and attachments;
FIG. 14 shows the attachment being secured to a powerhead;
FIGS. 15-17 show a locking mechanism for the powerhead and attachment;
FIGS. 18 and 19 show a second embodiment of the powerhead;
FIGS. 20 and 21 show a grinder attachment on the powerhead;
FIGS. 22-24 show a gearing mechanism for the grinder attachment;
FIGS. 25 and 26 show a spice selector for the grinder attachment;
FIG. 27 is a cut-away view of the gearing mechanism;
FIG. 28 is a cut away view of the spice hopper;
FIG. 29 shows the door of the spice hopper;
FIG. 30 shows a wine opener attachment and powerhead;
FIG. 31 is a cut-away view of the wine opener attachment;
FIG. 32 shows the internal components of the wine opener attachment;
FIG. 33 is an exploded view of FIG. 32;
FIGS. 34-39 show various stages of the operation of the wine opener attachment; and
FIGS. 40-42 show a foil cutter used with the wine opener attachment.

DETAILED DESCRIPTION OF THE INVENTION

FIG. 1 shows the modular kitchen appliance system of the present invention. The system comprises a powerhead 10 that operates various kitchen appliance attachments that are selectively attached to the powerhead. Several examples of attachments are shown, such as an immersion blender 12, whisk 14, milk frother 16, wine opener 18, spice grinder 20 and can opener 22. These examples are not exclusive, and other attachments not shown are within the scope of the invention.

FIGS. 2 and 3 show the powerhead 10 in more detail. The powerhead comprises a housing 11 that enclose various components such as a motor 70 and a battery 72 (see FIG.

10). The housing 11 has a forward end 13, onto which the attachments are secured, and a rearward end 15.

FIG. 2 shows a top portion of the powerhead 10 having a primary switch 24 for turning the powerhead on and off. A second safety switch 26 is adjacent the primary switch 24 and must be pressed simultaneously to power the motor. FIG. 3 shows a bottom of the powerhead 10 having a charging port 30 for charging the battery and a third reverse switch 28 that can reverse the rotational direction of the motor.

FIG. 4 shows the charging port 30 having two charging pins or terminals 32 with a metal plate 34 therebetween. A charger 36 (see FIG. 5) is connected to the charging port 30 and includes a charging head 37 that connects to the powerhead 10, and a wall plug 42 for connecting to a wall outlet.

Figure 5A:
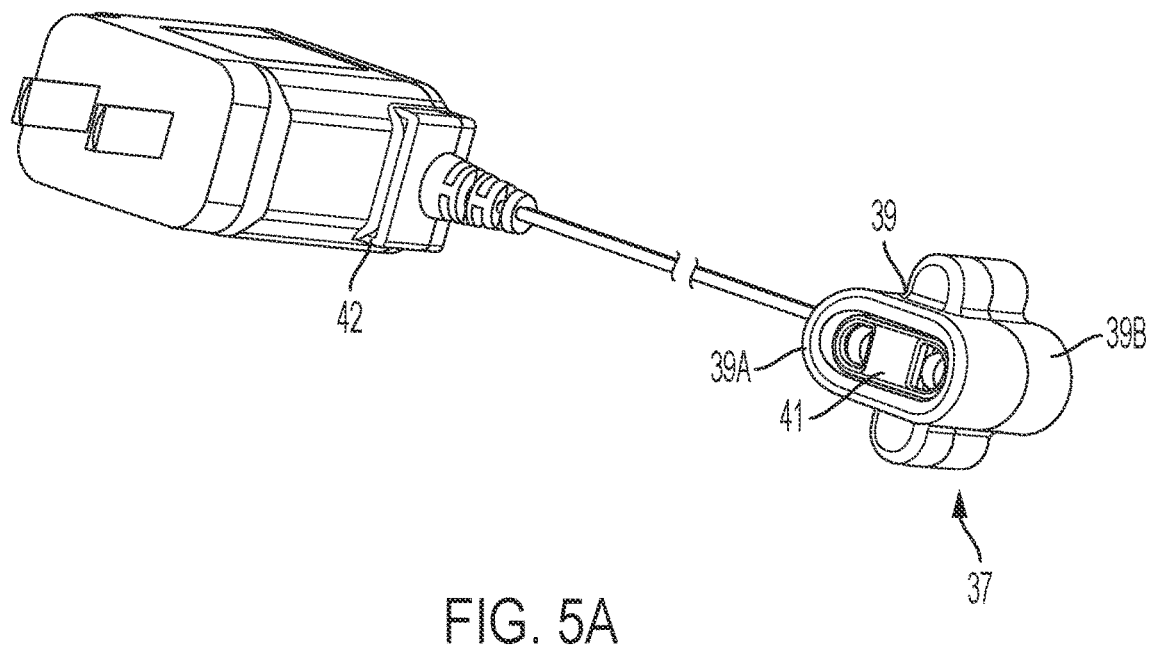
Figure 5B:
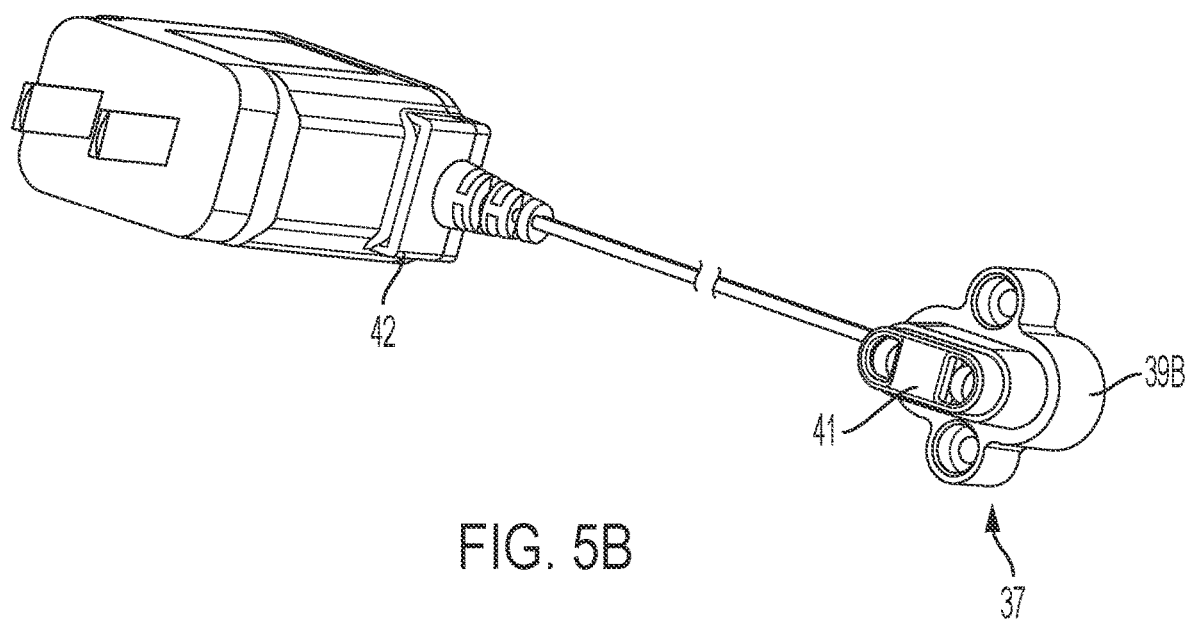

FIGS. 5A and 5B show the charger head 37 with an overmold 39 surrounding a contact head 41. The overmold 39 is formed from two pieces 39A and 39B that enclose the contact head 41. The front overmold 39A is formed to correspond to the outer contour of the powerhead at the charging port 30 so a smooth fit is achieved. FIG. 5B shows the front overmold 39A removed to better show the contact head 41.

Figure 6:
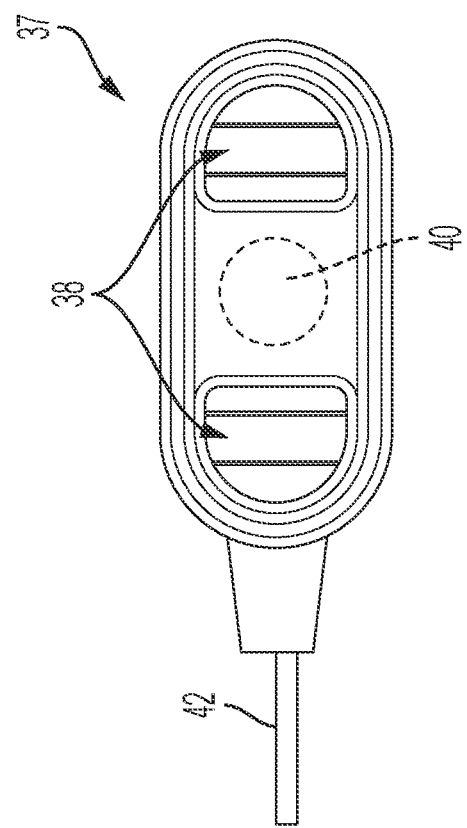

FIG. 6 shows an end face of the charging head 37. The charging head has two spring contacts 38 and a magnet 40. The magnet 40 is attracted the metal plate 34 of the charging port 30 to secure the engagement between the charging pins 32 and the contacts 38. The charger 36 shown in FIGS. 5 and 6 show a compact charger for users who have limited space and wish to hide the charger in a cabinet or drawer.

FIGS. 8, 8A and 9 show an alternative cup style charger 50 for users with more space, allowing them to keep their powerhead 10 out in the open, for example on their countertop. The charger 50 is formed from two pieces, a base 60 (shown in FIG. 9) and a stantion 52 that's placed over the base. The stantion 52 provides an upright support for holding the powerhead 10 while charging and allows the user to easily insert and remove the powerhead 10 when needed. The stantion 52 includes an opening for securing and providing access to contact head 41, with a power cord 42 extending out from the stantion 52.

Referring now to FIG. 7, a rear end of the powerhead 10 is shown having a rotatable cap 44. The cap 44 can be rotated between two positions which controls the speed of the motor 70. Rotating the cap 44 to the left in FIG. 7 slows the motor down, and rotating the cap 44 to the right increases the speed of the motor.

Referring now to FIG. 10, the inside of the powerhead 10 is shown. The housing 11 holds the components of the powerhead, including the motor 70 and the battery pack 72. The motor 70 has a drive shaft 74 surrounded by an enclosure 76, which includes an opening 78 through which the drive shaft 74 can engage with the various attachments. A PCB 64 lies over the battery pack 72 and receives signals from the various switches and sensors on the powerhead to control the operation of the motor.

The battery pack 72 provides energy to the motor 70 using rechargeable cells. However, it should be understood that removable (either disposable or rechargeable) batteries or even an AC power cord could power the motor and still fall within the scope of the invention. A switch 66 electrically connects the motor 70 and battery pack 72, and is actuated by switch 24.

At least two Hall sensors 78 are provided adjacent enclosure 76. The Hall sensors 78 are used to identify the attachment connected to the powerhead 10 and adjust the powerheads operation accordingly. For example, a particular attachment may not need to reverse the motor or have multiple speed controls, and the Hall sensors would recognize the attachment and could disable those features.

Magnets are used on the attachment to signal to the Hall sensor what type of attachment is being used. FIGS. 11-13 show various examples, and in particular FIG. 11 shows an attachment 80 with no magnets. The Hall sensors 78 detecting no magnet send a signal (or absence of a signal) to the PCB, which identifies the attachment and operates the powerhead in a first mode, whereby all the features of the powerhead are enabled. In other words, the powerhead motor can be reversed and/or its speed adjusted.

FIG. 12 shows a second attachment 82 having a single magnet 84 that is positioned adjacent one of the Hall sensors 78. The Hall sensor 78 detects the magnet 84, and then instructs the powerhead to operate in a second mode, where the speed selector is disabled, but the motor reversing feature is enabled. This second mode is activated when only one magnet is sensed, regardless which Hall sensor is triggered.

FIG. 13 shows a third attachment having two magnets 88 adjacent the two Hall sensor 78 when connected. Both Hall sensors 78 detect the presence of the magnets and instruct the powerhead to operate in a third mode where both the speed selector and reversing feature are disabled.

In addition to the Hall sensors 78, the PCB 64 receives inputs from the switches 24, 26, 28 and the cap 44 to control the motor and other operational characteristics of the powerhead.

Reference is now made to FIG. 14 which shows the powerhead 10 and a generic attachment 90. The attachment 90 can be any one of the attachments shown in FIG. 1, but is shown generically here to illustrate how the attachment is secured to the powerhead 10.

FIG. 15 shows the front end 13 of the powerhead 10. The enclosure 76 surrounding the motor drive shaft 74 includes a locking rail 92 and a tab 94. The attachment 90 has an interior space 96 into which the enclosure 76 is inserted. The attachment 90 includes a first rib 98 and a second rib 100 in a generally T-shaped configuration, projecting inwardly into the interior space 96.

To secure the attachment 90 to the powerhead 10, the attachment 90 is moved onto the powerhead 10 as shown by arrow 93 in FIG. 14. The rib 98 is positioned adjacent a slot 102 formed by the rail 92, and then the attachment 90 is rotated. The rib 98 then slides into the slot 102. See FIGS. 16 and 17 which shows the movement of the ribs 98 and 100 as they are moved into the locked position.

FIG. 15 shows the rail 92 is generally L-shaped, where a leg portion 104 is slightly angled to create a larger opening for the rib 98. The angled leg 104 allows for the rib 98 to more easily enter the slot 102 and also creates a cam surface that pulls the attachment 90 toward the powerhead 10, creating a tighter and firmer connection between the two.

Additionally, when the attachment 90 is rotated into its locked position, the other rib 100 slides over tab 94. The tab 94 is flexible and includes a bump 106 on its free end that's flexed as the rib 100 slides over. The tab 94 provides haptic feedback notifying the user that the attachment has been properly secured. The tab 94 also functions to reduce the likelihood that the attachment 90 would inadvertently rotate out of the locked position.

A second set of ribs 98 and 100 and corresponding rail 92 and tab 94 are positioned opposite the first set to provide a more secure connection between the powerhead 10 and attachment 90. Although two sets are shown in the figures, any number of ribs 98/100 and rail 92 tab 100 combinations could be used depending on how strong a connection is desired.

Now referring to FIGS. 18 and 19, an alternative embodiment of the powerhead 110 is shown. The powerhead 110 is a simpler version of the powerhead 10, with some features removed to reduce cost and complexity. Unless otherwise noted, the powerhead 110 operates similarly to powerhead 10, including the how the attachments are connected to the powerhead as described above. For convenience, identical elements to those found on powerhead 10 are given the same reference number here.

The powerhead 110 includes a switch 24 for turning the device on and off. A reverse side includes a safety switch 26 which must be depressed simultaneously with the switch 24 for providing energy to the device. A charging port 30 provides electricity to the internal rechargeable battery pack 72. A rear cap 44 is rotatable in both the clockwise and counterclockwise directions to control the speed of the motor 70. The front end of the powerhead includes an enclosure 76 identical the previous embodiment, and the locking mechanism for the attachment can be identical as well. The powerhead 110 further include a pair of legs 112 prevent it from rolling around when lying on a flat surface.

Dual Spice Grinder

FIG. 20 shows the dual spice grinder attachment 20 secured to the powerhead 110 of the present invention. The dual spice grinder includes a hopper 204 for holding two different spices (or other material to be ground) in separate chambers. The spices can be any food material, including salt, peppercorn, coffee beans, seeds, etc.

The spice grinder attachment 20, shown separately in FIG. 21, includes a reduction gearbox housing 200, a spice selector 202 and the spice hopper 204. FIG. 22 shows the internal gear assembly of the grinder attachment 20.

Power is delivered to the grinder attachment 20 through an attachment shaft 208 that extends from the reduction gearbox housing 200 and is connected to the drive shaft 74 of the powerhead motor 70. The gearbox housing 200 includes a reduction gearbox 206 that reduces the rotational speed of the powerhead motor before it's transferred to grinders 224 and 226.

Referring now to FIGS. 22 and 23, the reduction gearbox 206 outputs to a drive axle 210 that is connected to a pair of slip gears 212 and 214. The drive axle 210 is fixedly connected to a drive gear 211 which engages slip gears 212 and 214, with the slip gears connected to respective grinder gears 216 and 218. The grinder gear 216 is attached to an axle 220 and grinder gear 218 is attached to axle 222. Each axle 220 and 222 is attached to grinder 224 and 226, which grind the spices in the hopper 204.

Referring now to FIG. 23, the operation of the slip gears 212 and 214 is explained. Each slip gear functions in the same way, and so a description of only slip gear 212 is provided. The slip gear 212 includes a top gear wheel 212a and a bottom gear wheel 212b. The bottom gear wheel 212b is rotatably connected to grinder gear 216. The top gear wheel 212a includes a series of ramps 230a facing a corresponding series of ramps 230b on the bottom gear wheel 212b. The ramps having matching inclined surfaces 232a and 232b so that when the top gear wheel 212a is rotated in the counter-clockwise direction, the inclined surfaces 232a and 232b ride up one another and force the top gear wheel 212a upward until the ramps 230a and 230b disengage. At this point, the top gear wheel 212a slips and rotates relative to the bottom gear wheel 212b. When the top gear wheel 212a and bottom gear wheel 212b slip, the bottom gear wheel does not rotate, and no rotational movement is transferred to the grinder 224.

Referring to FIG. 24, the drive gear 211, slip gears 212 and 214, and grinder gears 216 and 218 are enclosed in the spice selector 202 by a top housing 240 and a bottom housing 242 and a spice selector wheel 244. The spice selector wheel 244 is rotatable with respect to the top housing 240 and bottom housing 242 to select which spice is to be ground.

The spice selector wheel 244 has a protrusion 246 that projects from the bottom of the wheel, as shown in FIG. 25. The wheel 244 rotates so that the protrusion 246 sits over one of the slip gears 212 or 214, thus preventing one of the top gear wheel (212a or 214a) from separating from its corresponding bottom gear wheel (212b or 214b). As shown in FIGS. 26 and 27, the protrusion 246 sits over the right slip gear 214, preventing the top gear wheel 214a from separating from its corresponding bottom gear wheel 214b. Without this separation, the top gear wheel 214a transfers its rotation to the bottom gear wheel 214b and ultimately to the grinder 226. Depending on which slip gear 212 or 214 the protrusion 246 sits over, the spice selector 202 determines which one of the grinders 224 or 226 is operational at any time.

This design allows one of the two spices to be selected without having to change the rotational direction of the motor. In prior art grinders with two different spices, switching between two different grinders was done by reversing the rotation of the motor, thereby engaging one set of gears and disengaging from a second set. The present design eliminates the need to a have a reversible motor.

The spice selector wheel 244 includes several curved slots 248a, 248b, 248c, and 248d to accommodate the various gear axles that pass through the wheel 244 (see FIG. 25). The slots allow for the wheel 244 to be rotated between its two positions without being interrupted by any of the axles. The wheel 244 also includes an indicator 262 to identify to the user which spice is selected and ribs 264 around its circumference to make it easier to grip.

Now referring to FIG. 28, the spice hopper 204 is shown having a clear outer housing 250 that contains the two grinders 224 and 226. Each grinder is housed in a separate chamber 253a and 253b separated by a clear wall 252. Above the housing 250 and formed as part of the bottom gearbox housing 242, are a pair of doors 254 and 256 that allow materials to be added to each chamber 253a and 253b, respectively. Below the grinders 224 and 226 are thumbscrews 270 and 272 that adjust the grinders to control how fine or coarse the material is ground.

FIG. 29 shows the right door 256 in the open position. The door 256 pivots about an axle 257 and includes a stop 258 to prevent the door from opening too much and tab 260 which provides a light interference to keep the door in place when closed.

Wine Opener

Another example of an attachment that can be used with the powerhead 110 is a wine opener attachment 18 shown in FIG. 30. The wine opener 18 has a free end with an opening that slides over the neck 304 of a bottle 302 and removes a cork 306.

FIGS. 31-33 show the wine opener 18 in more detail. The wine opener 18 has an outer clamshell housing 308 that holds a gearbox 310 and a bottle stop 312. An output shaft 316 extends out from the gearbox 310 and mates with the driveshaft 74 of the powerhead 110. A corkscrew 320 is connected to an output 311 of the gearbox 310. A spring 322 surrounds the corkscrew 320 and is set against the gearbox 310 at one end, and against a thrust bearing 324 at the other.

As can be seen from FIGS. 31 and 33, the bottle stop 312 houses a bearing holder 314 which secures the thrust bearing 324.

The gearbox 310 includes a set of gears (not shown) that reduces the rotational output of the powerhead so that the corkscrew 320 rotates at a lower speed than the powerhead motor. Also shown in FIG. 31 is a foil cutter 326 that clips onto the end of the wine opener 18. The foil cutter is a tool that helps to remove the foil that's typically wrapped around the top of the bottle and covering the cork and will be described in further detail below.

Figure 34:
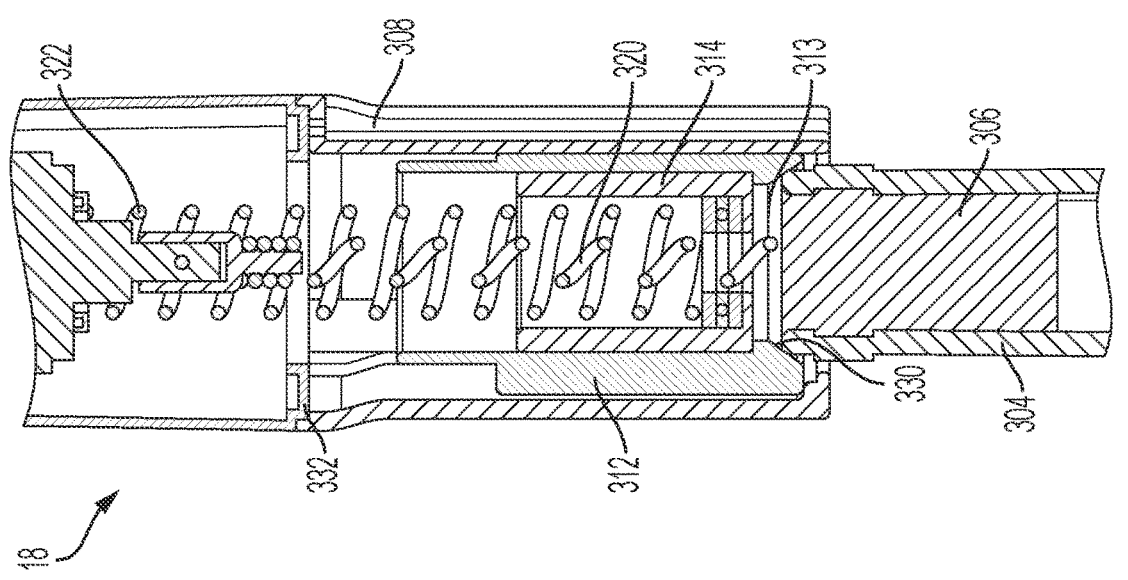

Now referring to FIGS. 34-39, the operation of the wine opener will be explained. FIG. 34 shows the working end of the wine opener 18 as it is initially placed against the wine bottle 302. As the neck of the bottle is inserted into the opening it engages an inclined surface 330 of the bottle stop 312, which helps to center the bottle within the wine opener. The opening 313 defined by the top end of inclined surface 330 is large enough to accommodate the cork 306, but not the bottle itself.

Figure 35:
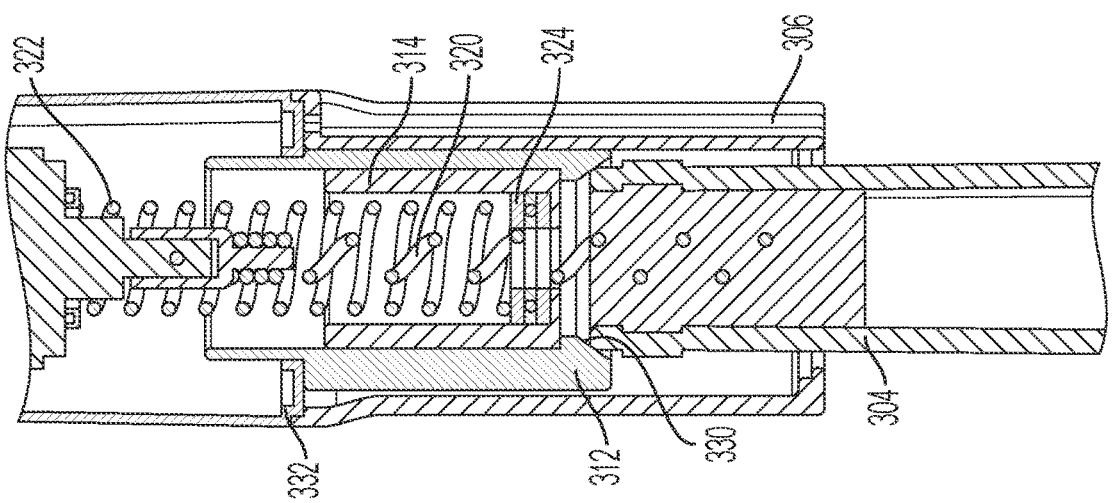

Powerhead 110 is turned on and the corkscrew is spinning and pushed down into the cork. As the wine opener is pressed down, the bottle stop 312 is pushed upwardly within the housing 308 against the bias of the spring 322 until the bottle stop 312 is stopped by protrusion 322. This is shown in FIG. 35. At this point, the wine opener can no longer push down over the top of the bottle because of bottle stop 312 abutting the protrusion 322. Therefore, as the corkscrew 320 embeds deeper into the cork 306, the cork 306 is pulled out of the bottle 304. See FIG. 36.

As the cork 306 is pulled out, it presses up against the bearing holder 314 (which is holding thrust bearing 324) and moves upward against the spring 322, until it is fully removed from the bottle. See FIG. 37. At this point the powerhead 110 can be turned off, and the bottle 304 pulled out of the wine opener 18. However, the cork 306 remains on the corkscrew 320.

Figure 38:
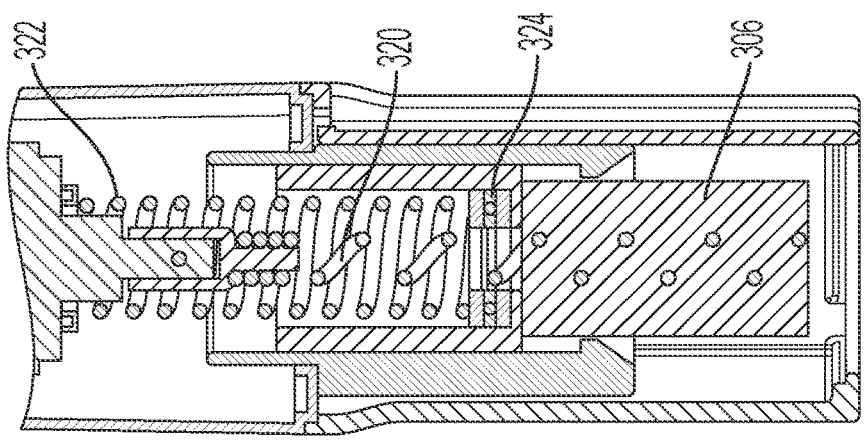
Figure 37:
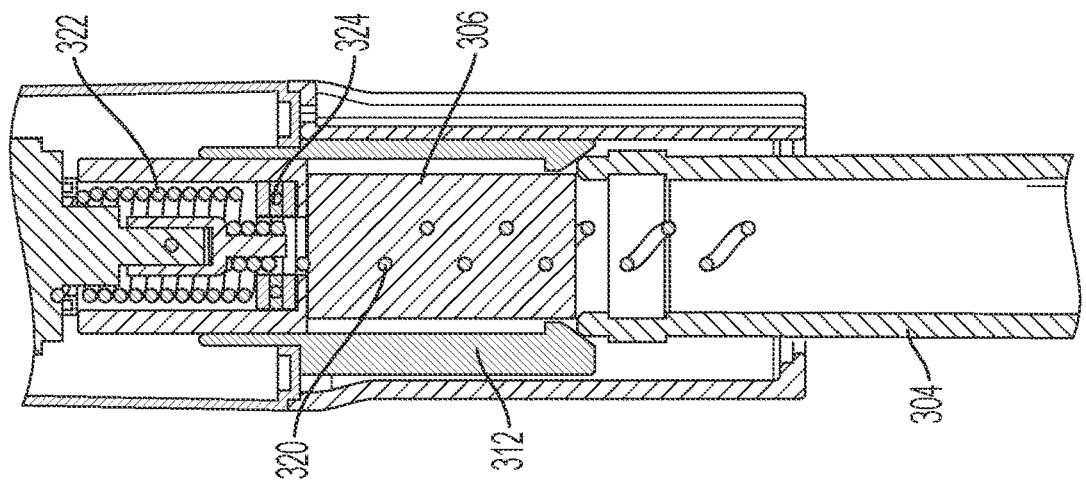

The fully compressed spring 322 now pushes down on the cork 306 to unwind it from the corkscrew 320. FIG. 38 shows the cork partially unwound and FIG. 39 shows the cork fully unwound from the corkscrew. Obviously, the downward force of the spring must be strong enough to overcome the frictional forces maintaining the cork 306 on the corkscrew 320. The unwinding of the cork 306 is facilitated because both the thrust bearing 324 and the bearing holder 314 are freely rotatable within the bottle stop 312, allowing the cork 306 to rotate as it's unwound. In a further embodiment of the invention, a latching system could be added to the opener to hold the spring 324 in its compressed state and contain the cork 306 within the wine opener until the user is ready to release the latch and allow the cork 306 to be unwound from the corkscrew 320.

One of the advantages of the present wine opener 18 is that it allows for the cork 306 to be removed through the use of the spring 322 rather than reversing the rotation of the motor.

Now referring to FIGS. 40-42, the foil cutter 326 is explained in further detail. The foil cutter 326 is used to remove foil that is normally wrapped around the cork of a wine bottle. FIG. 40 shows the top of the foil cutter 326 having an a slit 334 that ends in an aperture 336. The slit 334 and aperture 336 divide the cutter into two halves 340a and 340b that can be biased into an open and closed position. FIG. 42 shows the bottom of the foil cutter having four posts 338 that hold two cutting blades 340 and 342.

The foil cutter 326 is placed over the foil on a bottle and the two halves 340a and 340b are squeezed together to bring the two halves 340a and 340b together. The blades 340 and 342 are positioned so that they gently cut into the foil without damaging the bottle itself. The foil can then be removed from the bottle.

Additionally, as shown in FIGS. 30, 40 and 41, the top of the foil cutter 326 includes tabs 344 that when squeezed together fit within a ledge of the housing 308 of the wine opener. This provides a convenient and easy storage location for the foil cutter 326.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A modular kitchen appliance, comprising:
   a powerhead having motor with a drive shaft;
   a grinder attachment removably attached to the powerhead, the grinder attachment having an attachment shaft that's connected to the drive shaft of the motor;
   the attachment shaft connected to a drive axle operatively connected to a first slip gear and a second slip gear;
   the first slip gear connected to a first grinder and the second slip gear connected to a second grinder;
   a hopper capable of holding two different materials for grinding;
   a spice selector wheel has a protrusion that projects over from the bottom of the wheel and is movable over one of the first slip gear or second slip gear preventing the top gear wheel from separating from the bottom gear wheel; and wherein in a first mode of operation, the first slip gear transfer power to the first grinder and the second slip gear does not transfer power to the second grinder, and in a second mode of operation the second slip gear transfer power to the second grinder and the first slip gear does not transfer power to the first grinder.

2. The modular kitchen appliance according to claim 1, wherein the first and second slip gears each have a top gear wheel and a bottom gear wheel that are selectively able to rotate relative to each other.

3. The modular kitchen appliance according to claim 2, wherein the top gear wheel and bottom gear wheel of each of the first and second slip gears have ramps that separate the top gear wheel from the bottom gear wheel to allow them to rotate relative to each other.

4. The modular kitchen appliance according to claim 2, wherein the motor rotates in the same direction in the first and second mode of operation.

* * * * *